US006574084B1

(12) United States Patent
Kishida et al.

(10) Patent No.: US 6,574,084 B1
(45) Date of Patent: Jun. 3, 2003

(54) ELECTROMAGNETIC REPULSION DRIVEN SWITCH

(75) Inventors: Yukimori Kishida, Tokyo (JP); Hiroyuki Sasao, Tokyo (JP); Chie Takahashi, Tokyo (JP); Kazuhiko Kagawa, Tokyo (JP); Yoichi Ueno, Tokyo (JP); Eiji Moritoh, Tokyo (JP); Takafumi Nishioka, Tokyo (JP); Tokio Nakashima, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/856,375

(22) PCT Filed: Oct. 23, 2000

(86) PCT No.: PCT/JP00/07356

§ 371 (c)(1),
(2), (4) Date: Sep. 25, 2001

(87) PCT Pub. No.: WO01/31667

PCT Pub. Date: May 3, 2001

(30) Foreign Application Priority Data

Oct. 28, 1999 (JP) .......................................... 11-307045

(51) Int. Cl.[7] .......................... H02H 5/04; H01H 47/00
(52) U.S. Cl. ........................ 361/140; 361/161; 361/106
(58) Field of Search ................................ 361/165, 161, 361/140, 106, 93.6; 324/105; 218/22

(56) References Cited

U.S. PATENT DOCUMENTS 4,138,708 A * 2/1979 Takeshima .................. 327/449
5,379,014 A * 1/1995 Sato et al. .................. 335/177
6,046,423 A 4/2000 Kishida et al. ............. 218/154
6,097,246 A * 8/2000 Tsurunaga et al. .......... 327/599
6,109,235 A * 8/2000 Hoshiba et al. ........ 123/339.11

FOREIGN PATENT DOCUMENTS

JP 8-222092 A 8/1996
JP 11-25817 A 1/1999

OTHER PUBLICATIONS

U.S. patent application Ser. No. 09/360,690, Kishida et al., filed Jul. 26, 1999.

U.S. patent application Ser. No. 09/472,825, Takeuchi et al., filed Dec. 28, 1999.

Kishida et al., "Development Of The High Spped Switch And Its Application", Conference Record of the IEEE–IAS Annual Meeting, Jan. 1998, pp. 2321–2328.

* cited by examiner

*Primary Examiner*—Kim Huynh
(74) *Attorney, Agent, or Firm*—Leydig, Voit & Mayer, Ltd.

(57) ABSTRACT

An electromagnetic repulsion drive switching device in which a contact-closing coil and a contact-opening coil are arranged to confront a conductive repulsive member, and in which a drive current is fed to a selected one of the individual coils from a capacitor charged to a predetermined charge voltage by a charging power source. A stationary contact and a movable contact are brought into and out of contact by a repulsion electromagnetic force generated between the coils and the repulsion member. A voltage control controls the output voltage of the charging power source so that the peak value of the drive current may fall within a range with respect to a temperature change of the capacitor. As a result, even if the working temperature of the capacitor changes, the drive current of the contact-closing coil and the contact-opening coil falls within a desired range.

9 Claims, 17 Drawing Sheets

ELECTROSTATIC CAPACITY [A.U]
TEMPERATURE [°C]
32

EQUIVALENT SERIES RESISTOR [A.U.]
TEMPERATURE [°C]
33

DRIVE CURRENT PEAK VALUE[A.U]
TEMPERATURE [°C]
WORKING RANGE
34
35

TIME
36
37
38

44 VARIABLE IMPEDANCE

ELECTROMAGNETIC REPULSION DRIVEN SWITCH

TECHNICAL FIELD

This invention relates to an electromagnetic repulsion drive switching device for closing/opening a pair of contacts by a drive force utilizing an electromagnetic repulsion.

BACKGROUND ART

FIG. 22 is a construction diagram of an electromagnetic repulsion drive switching device of the prior art, and FIG. 23 is a drive circuit diagram of FIG. 22.

FIG. 22 shows the state in which a stationary contact 1*a* and a movable contact 1*b* of a vacuum valve 1 are opened (or parted) so that individual terminals 2*a* and 2*b* are "open". A capacitor 3 is charged to a predetermined voltage from a charging power source 4 through a charge resistor 5. When a contact-closing thyristor switch 7*a* is turned "ON" with a contact-closing gate signal from a gate pulse unit 6, a pulsating drive current flows from the capacitor 3 to a contact-closing coil 8*a* so that a magnetic field is generated. As a result, an induction current is so generated in a repulsion member 9 that a magnetic field reversed from the magnetic field of the coil 8*a* is generated. By the interactions between the magnetic field generated by the contact-closing coil 8*a* and the magnetic field generated by the repulsion member 9, this repulsion member 9 receives an electromagnetic repulsion from the coil 8*a*. The movable contact 1*b*, as integrated with the repulsion member 9 by the electromagnetic repulsion force, moves upward in FIG. 22 to close (or contact)the individual contacts 1*a* and 1*b*.

Since the electromagnetic repulsion drive switching device of the prior art has the construction thus far described, the several characteristics of an electrolytic capacitor to be used as the capacitor 3 generally vary with the working temperature. As a result, the drive current flow through the individual coils 8*a* and 8*b* fluctuates and raises a problem that the electromagnetic repulsion force is unstable.

Here: numeral 10 designates a reflux diode; numeral 11 a discharge resistor; and numeral 12 a voltage detector.

FIG. 24(*a*) is a temperature characteristic diagram of the electrostatic capacitance of the capacitor 3; FIG. 24(*b*) is a temperature characteristic diagram of an equivalent series resistor of the capacitor 3; FIG. 24(*c*) is a temperature characteristic diagram of the drive current peak value of the individual coils 8*a* and 8*b*; and FIG. 24(*d*) is an explanatory diagram illustrating waveforms of the drive currents of the individual coils 8*a* and 8*b*.

FIG. 24(*a*) is a temperature characteristic diagram of the electrostatic capacity of the capacitor 3; FIG. 24(*b*) is a temperature characteristic diagram of an equivalent series resistor of the capacitor 3; FIG. 24(*c*) is a temperature characteristic diagram of the drive current peak value of the individual coils 8*a* and 8*b*; and FIG. 24(*d*) is an explanatory diagram illustrating waveforms of the drive currents of the individual coils 8*a* and 8*b*.

In FIG. 24(*a*), the electrostatic capacitance of the capacitor 3 is decreased by 20% at the working temperature of −20° C., as compared with that at +20° C. In FIG. 24(*b*), the equivalent series resistor of the capacitor 3 is increased at −20° C. to about three times as high as that at +20° C. If the range of the drive current peak value, within which the precise actions are made within the working temperature range from −20° C. to +40° C., is the "working range" of FIG. 24(*c*), a decrease of about 20% occurs at −20° C. from that at +20° C. The waveforms are illustrated in FIG. 24(*d*).

In FIG. 24(*d*), numeral 13*a* designates the drive current of the capacitor 3 at +20°0 C., and numeral 13*b* designates the drive current of the capacitor 3 at −20° C. Thus, a reliably workable drive current peak value cannot be obtained on the low temperature side. If the working temperature of the capacitor 3 rises, on the other hand, the drive current increases to raise the electromagnetic repulsion force. There arises another problem that the mechanical load is augmented.

This invention has been conceived to solve the aforementioned problems and has an object to provide an electromagnetic repulsion drive switching device which is enabled to open/close the contacts precisely by confining the drive current for a contact-closing coil and a contact-opening coil within a predetermined range even if the working temperature of a capacitor changes.

DISCLOSURE OF THE INVENTION

According to this invention, there is provided an electromagnetic repulsion drive switching device in which a contact-closing coil and a contact-opening coil are arranged to confront a repulsive member having a conductivity, and in which a drive current is fed to a selected one of the individual coils from a capacitor charged to a predetermined charge voltage by a charging power source, so that a stationary contact and a movable contact are brought into and out of contact by a repulsion force of the electromagnetic force generated between the coil and the repulsion member. The electromagnetic repulsion drive switching device comprises voltage control means for controlling the output voltage of the charging power source so that the peak value of the drive current may fall within a predetermined range with respect to a temperature change of the capacitor. By controlling the fluctuations of the electrostatic capacity with respect to the temperature change of the capacitor with the output voltage of the charging power source, the peak value of the drive current is enabled to fall within the predetermined range to stabilize the switching actions.

In this invention, on the other hand, the voltage control means controls the output voltage of the charging power source such that when the working temperature of the capacitor is a first temperature for the reference, the charge voltage is set to Vc, and the drive current is set to I, and such that when the working temperature of the capacitor is a second temperature and the drive current is $\alpha \cdot I$, the charge voltage of the capacitor is set to $Vc/\alpha$. As a result, the switching actions can be stabilized by confining the drive current within the allowable working range.

In this invention, on the other hand, the voltage control means controls the charge voltage of the capacitor as a product of the reference voltage and a resistance ratio, so that the resistance of a resistor having a temperature dependency is confined in a formula for calculating the resistance ratio. As a result, the switching actions can be stabilized by confining the drive current within the allowable working range.

In this invention, on the other hand, the resistor having the temperature dependency has a resistance having negative characteristics with respect to the temperature, and a voltage suppression element for suppressing the voltage is connected in parallel with the resistor. Even if the capacitor becomes lower than the limit working minimum temperature, the voltage suppression element can act to control the impedance at the two ends of the resistor so that the charge voltage of the capacitor can be set to the allowable maximum impressed voltage or lower.

In this invention, on the other hand, the repulsion member is made of a flat metal member and there enables a simple structure.

In this invention, on the other hand, the repulsion member is a repulsion coil for generating an electromagnetic force in the direction opposed to that of an electromagnetic force which is generated by a selected one of a contact-closing coil and a contact-opening coil. As a result, the electromagnetic force can be easily adjusted.

In this invention, on the other hand, the temperature of the capacitor is controlled to fall within a predetermined range by temperature control means so that the peak value of the drive current of the capacitor may fall within the allowable working range. With this construction, too, the switching actions can be stabilized.

In this invention, on the other hand, the temperatures of the individual coils are controlled by temperature control means so that the fluctuations of the impedance of the capacitor may be compensated by detecting the temperature of the capacitor. With this construction, too, the drive current of the capacitor can be confined within the allowable working range to stabilize the switching actions.

In this invention, on the other hand, a variable impedance is connected individually with the individual coils and is controlled so that the peak value of the drive current may fall within a predetermined allowable working range with respect to a temperature change of the capacitor. With this construction, too, the switching actions can be stabilized.

In this invention, on the other hand, the variable impedance includes a variable inductance and a variable resistor. The variable inductance and the variable resistor are controlled to confine the peak value of the drive current within the predetermined allowable working range with respect to the temperature change of the capacity, so that the switching actions can be stabilized.

In this invention, on the other hand, the variable resistor is connected in parallel with the capacitor, and the entire impedance is controlled to a predetermined value so that the peak value of the drive current may fall within a predetermined allowable working range with respect to a temperature change of the capacitor. With this construction, too, the switching actions can be stabilized.

In this invention, moreover, a resistor having a temperature dependency is connected individually with the individual coils to compensate the impedance due to the temperature change of the capacitor so that the peak value of the drive current may fall within a predetermined range. With this construction, too, the switching actions can be stabilized.

BEST MODE FOR CARRYING OUT THE INVENTION

This invention will be described on its best mode with reference to the accompanying drawings so that it may be described in more detail.

Embodiment 1

Figure 1:
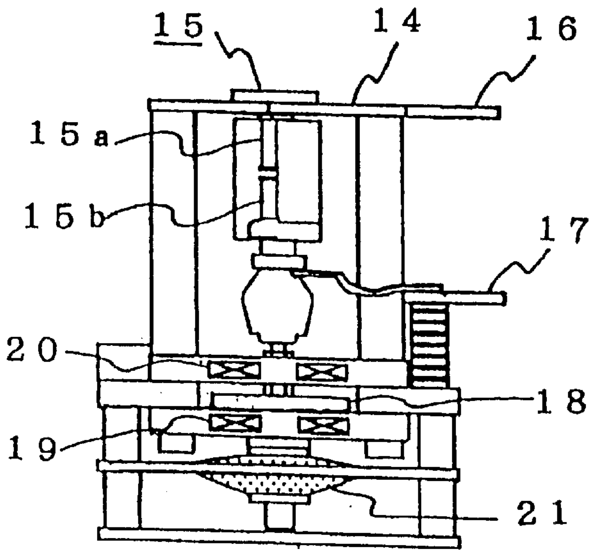
FIG. 1 is a construction diagram showing an essential portion of Embodiment 1 of this invention in a contact-opening (or opening) state.
Figure 2:
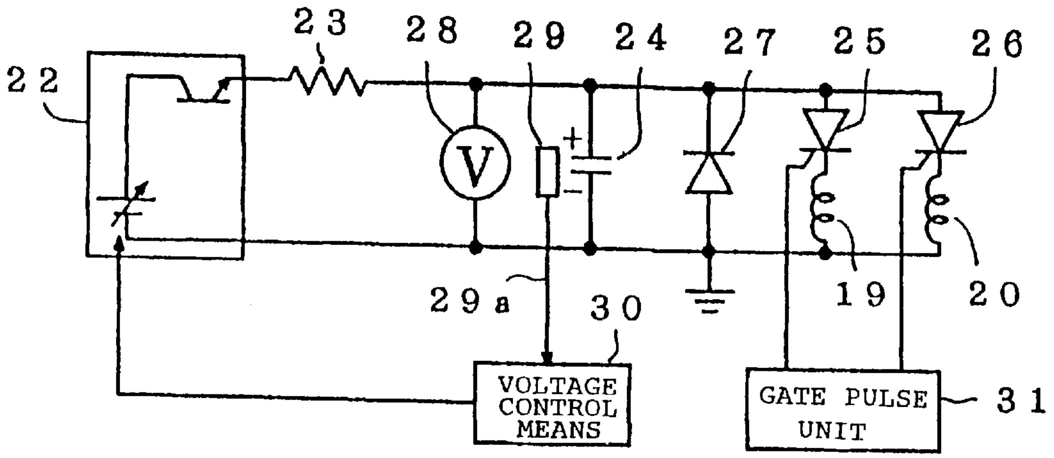
FIG. 2 is a drive circuit diagram of FIG. 1.

FIG. 1 is a construction diagram showing an essential portion of Embodiment 1 in a contact-opening (or opening) state, and FIG. 2 is a drive circuit diagram of FIG. 1.

In FIGS. 1 and 2, numeral 14 designates a frame, and numeral 15 designates a vacuum valve which is fixed on the frame 14 and constructed of a stationary contact 15*a* and a movable contact 15*b*. Numeral 16 designates an external terminal of the stationary contact 15*a*; numeral 17 an external terminal of the movable contact 15*b*; and numeral 18 a repulsion member which has a conductivity and fixed on the movable contact 15*b*. Numeral 19 designates a contact-closing coil which is fixed on the frame 14 and which is arranged to confront the repulsion member 18 and fed with a drive current from a later-described capacitor 24. Numeral 20 designates a contact-opening coil which is fixed on the frame and which is arranged on the side opposed to the contact-closing coil 19 as to confront the repulsion member 18 and fed with the drive current from the later-described capacitor 24. Numeral 21 designates a spring which pushes the movable contact 15*b* when the individual contacts 15*a* and 15*b* are closed (to contact).

Numeral 22 designates a DC charging power source; numeral 23 a charge resistor; and the numeral 24 a charging/discharging capacitor which feeds the drive current to the individual coils 19 and 20 and which is charged through the charge resistor 23 by the charging power source 22. Numeral 25 designates a thyristor switch which controls the drive current to be fed from the capacitor 24 to the contact-closing coil 19. Numeral 26 designates a thyristor switch which controls the drive current to be fed from the capacitor 24 to the contact-opening coil 20. Numeral 27 designates a reflux diode, and numeral 28 designates voltage detection means which detects the voltage of the capacitor 24. Numeral 29 designates temperature detection means which detects the temperature of the capacitor 24 to output a temperature signal 29*a*. Numeral 30 designates voltage control means which is fed with the temperature signal 29*a* to control the charging voltage of the capacitor 24 with the temperature signal 29*a*. Numeral 31 designates a gate pulse unit which controls the individual thyristor switches 25 and 26.

Figures 3A, 3B, 3C, 3D:
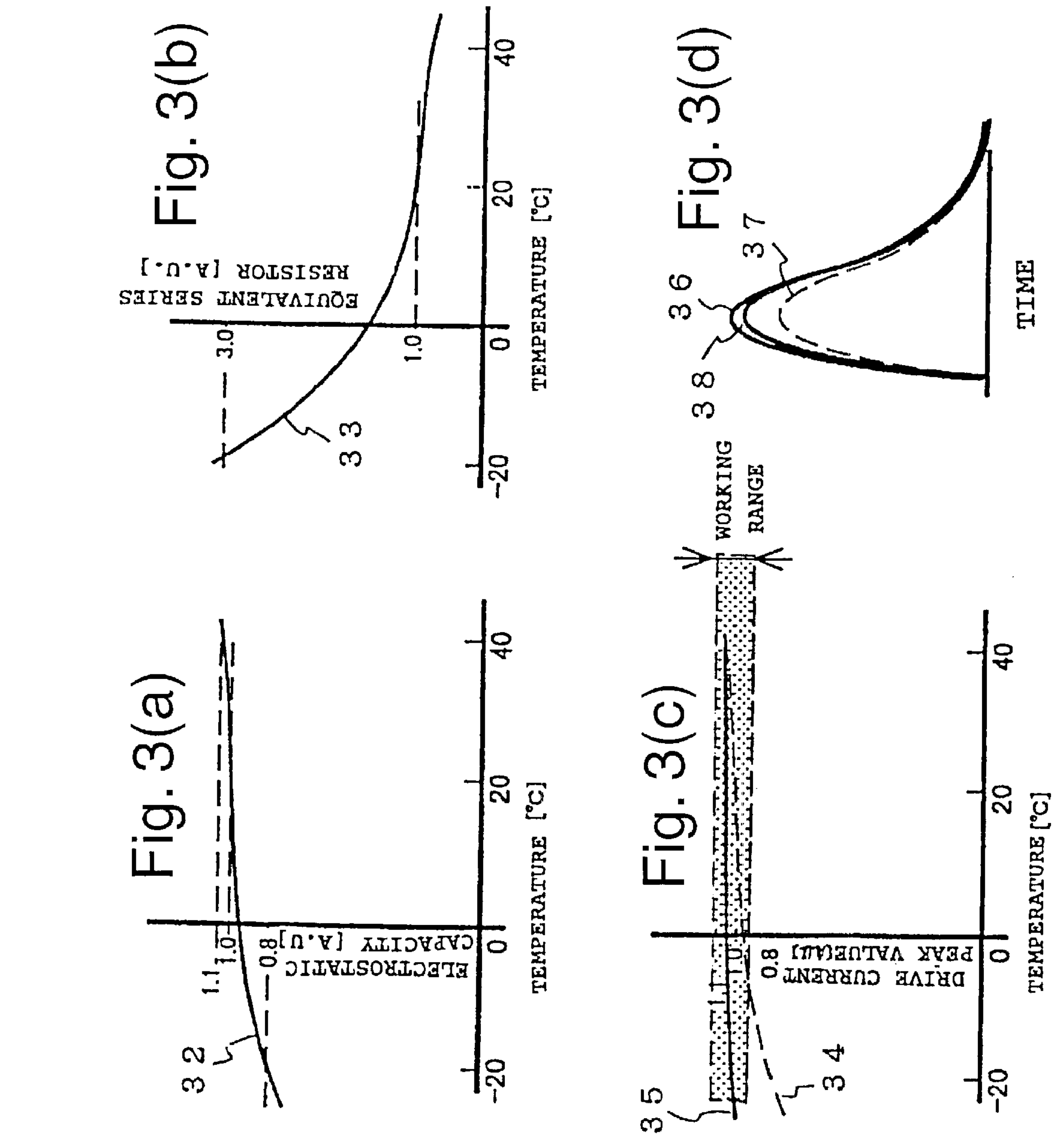
FIGS. 3(*a*)–3(*d*) are explanatory diagrams illustrating the temperature characteristics of a capacitor of FIG. 1.
Figure 4:
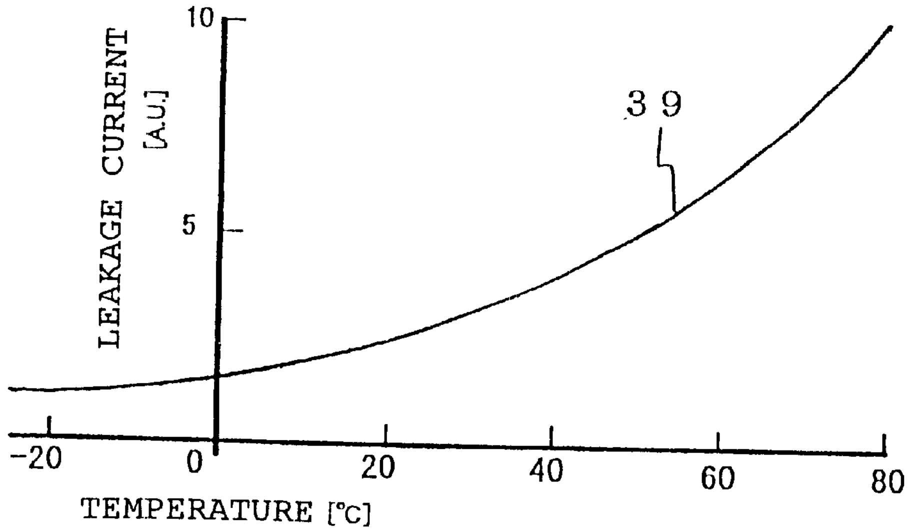
FIG. 4 is an explanatory diagram illustrating the temperature characteristics of the capacitor of FIG. 1.

Here will be described the actions. FIGS. 3 and 4 are explanatory diagrams illustrating the temperature characteristics of the capacitor 24. In FIG. 3(*a*), a characteristic curve 32 indicates the temperature characteristics of an electrostatic capacity of the capacitor 24. In FIG. 3(*b*), a characteristic curve 33 indicates the temperature characteristics of an equivalent series resistor of the capacitor 24. In FIG. 3(*c*), a characteristic curve 34 indicates the temperature characteristics of a drive current peak value of the capacitor 24, and a characteristic curve 35 indicates the temperature characteristics when the drive current peak value is controlled. In FIG. 3(*d*): a characteristic curve 36 indicates a drive current waveform when the working temperature of the capacitor 24 is at 20° C. and when the charging voltage is Vc; a characteristic curve 37 indicates a drive current waveform when the working temperature of the capacitor 24 is at −20° C. and when the charging voltage is Vc; and a characteristic curve 38 indicates a drive current waveform when the working temperature of the capacitor is at −20° C. and when the charging voltage is controlled. In FIG. 4, a characteristic curve 39 indicates the temperature characteristics of a leakage current of the capacitor 24.

An electrolytic capacitor to be generally used as the charging/discharging capacitor 24 has its electrostatic capacity, equivalent series resistance, drive current peak value and leakage current fluctuating with the working temperature, as illustrated in FIGS. 3(*a*) to 3(*d*). When the capacitor 24 has a reference working temperature of 20° C., more specifically, the electrostatic capacity decreases by 20% at −20° C. as illustrated in FIG. 3(*a*),(*b*), and the equivalent series resistance increases to about 30%. On the other hand, the peak value of the drive current to be outputted from the capacitor 24 to the individual coils 19 and 20 fluctuates with the working temperature, as indicated by the characteristic curve 34 of FIG. 3(*c*). In the case that the drive current has a peak value I for the charging voltage Vc of the capacitor 24 at a reference working temperature of 20° C., when the drive current has a peak value $\alpha \cdot I$ at a reference working temperature of −20° C., by setting the charging voltage of the capacitor 24 to $Vc/\alpha$, the drive current can be controlled within a predetermined fluctuation range, as indicated by the characteristic curve 35.

If here is ignored the circuit resistance in FIGS. 1 to 4, the following relation holds among the electrostatic capacity C and the charging voltage Vc of the capacitor 24, and the inductance L and the drive current I of the individual coils 19 and 20.

$$0.5 \cdot L \cdot I^2 = 0.5 \cdot C \cdot Vc^2$$

Thus, in generally, the peak value of the drive current to flow through the inductance is proportional to the charging voltage Vc of the capacitor 24. By making a control to raise the charging voltage gradually as the working temperature of the capacitor 24 grows the lower so that the charging voltage may be set to $Vc/\alpha$ at −20° C., therefore, the drive current can be controlled to fall within a predetermined range when the working temperature of the capacitor 24 is at +20° C. to −20° C.

Next, when a gate signal is commanded in the contact-opened state of FIG. 1 from the gate pulse unit 31 to the contact-closing thyristor switch 25, the contact-closing thyristor switch 25 is turned ON. As a result, the drive current flows from the capacitor 24 to the contact-closing coil 19 so that a magnetic field is generated. An induction current is generated in the repulsion member 18 so that a magnetic field reversed from the magnetic field of the contact-closing coil 19 may be generated. By the interaction between the magnetic field generated by the contact-closing coil 19 and the magnetic field generated by the repulsion member 18, this repulsion member 18 receives a repulsive force against the contact-closing coil 19. By this electromagnetic repulsive force, the movable contact 15*b* moved upward of FIG. 1 to contact with the stationary contact 15*a*. As a result, the contact-closing action ends to establish the contact-closed state.

If, in this contact-closed state, the gate signal is commanded from the gate pulse unit 31 to the contact-opening thyristor switch 26, this contact-opening thyristor switch 26 is turned ON so that the drive current flows from to the capacitor 24 to the contact-opening coil 20. By the interaction between the magnetic field generated by the contact-opening coil 20 and the magnetic field generated by the repulsion member 18, moreover, the repulsion member 18 receives the repulsive force against the contact-opening coil 20. By this electromagnetic repulsive force, the movable contact 15*b* moves downward of FIG. 1 and leaves from the stationary contact 15*a* to establish the contact-opened state. In this case, too, by setting the charging voltage to $Vc/\alpha$ for −20° C., the drive current can be controlled within a predetermined range when the working temperature of the capacitor 24 is +20° C. to −20° C.

By controlling the output voltage of the charging power source 22 by the fluctuation of the electrostatic capacity with respect to the temperature change of the capacitor 24, as has been described, the peak value of the drive current is brought to fall within the predetermined range so that the stable switching actions can be obtained.

In order that the charge voltage of the capacitor 24 may be $Vc/\alpha$ when the drive current is I for the reference or first temperature of the working temperature of the capacitor 24 and for the charging voltage Vc and when the drive current is $\alpha \cdot I$ for the second temperature, the output voltage of the charging power source 22 is controlled by the voltage control means 30 with reference to the temperature characteristics of the capacitor 24. As a result, the switching actions can be stabilized by setting the drive current within the allowable working range, as indicated by the characteristic curve 35 in FIG. 3(*c*).

With the aforementioned construction of FIG. 2, here will be described the case in which the output voltage of the charging power source 22 is controlled by calculating a reduction in the electrostatic capacity due to the aging of the capacitor 24 from the leakage current of the capacitor 24. The charging current of the capacitor 24, as outputted from the charging power source 22 through the charge resistor 23, is detected by the current detection means(not-shown). In this case, the temperature characteristics are similar to those of the characteristic curve 39 of FIG. 4. If the charge of the capacitor 24 is completed, moreover, the charging current is equal to the leakage current of the capacitor 24. Still moreover, the leakage current is well known to increase due to the aging. Specifically, the characteristic curve 39 of FIG. 4 is shifted upward due to the aged deterioration. From the temperature signal 29*a* of the temperature detection means 29 having the working temperature of the capacitor 24 and the leakage current detected, the electrostatic capacity of the capacitor 24 can be calculated by the voltage control means 30. When the electrostatic capacity calculated at the working temperature is short, moreover, the voltage control means 30 controls the output voltage of the charging power source 22 to control the charging voltage of the capacitor 24. As a result, the drive current outputted from the capacitor 24 can fall within the allowable working range, as indicated by the characteristic curve 35 in FIG. 3(*c*), so that the switching actions can be stabilized.

In the construction of FIG. 2, moreover, here will be described the control of the output voltage of the charging power source 22, as will be made by detecting the drive current of the capacitor 24. First of all, the drive currents of the individual coils 25 and 26, as outputted from the capacitor 24, are detected by the current detection means (not-shown).

Then, the working temperature of the capacitor 24 is calculated from the characteristic curve 34 of FIG. 3(*c*), and the electrostatic capacity and the equivalent series resistance are calculated from FIGS. 3(*a*) and 3(*b*). The switching actions can be stabilized by controlling the output voltage of the charging power source 22 so that the drive current may fall within the allowable working range, as indicated by the characteristic curve 35, of FIG. 3(*c*). In this case, in order to set the output voltage of the charging power source 22, it is necessary to operate the individual coils 19 and 20 with the drive current of the capacitor 24. Therefore, the drive current cannot be detected before the gate signal of the individual thyristor switches 25 and 26, so that the output voltage of the charging power source 22 cannot be set. Therefore, an application can be made for setting the output voltage at the time of a periodic inspection.

Embodiment 2

Figure 5:
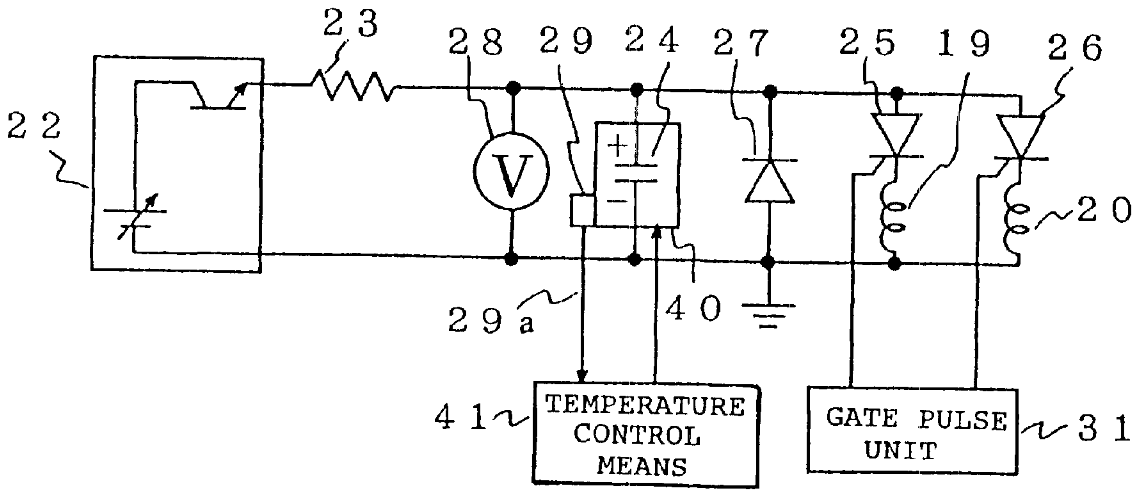
FIG. 5 is a drive circuit diagram of Embodiment 2 of this invention.

The construction diagram of Embodiment 2 is similar to that of FIG. 1 for Embodiment 1. FIG. 5 is a drive circuit diagram of Embodiment 2. In FIGS. 1 and 5, the components 1 to 29 and 31 are similar to those of Embodiment 1. Numeral 40 designates a temperature control chamber which accommodates the capacitor 24. Numeral 41 designates temperature control means which receives the temperature signal 29*a* and controls the temperature of the temperature control chamber 40 so that the capacitor 24 may be controlled to a predetermined temperature.

Here will be described the actions. In FIGS. 1 and 5, the temperature control means 41 controls the temperature of the temperature control chamber 40 with the temperature signal 29*a* of the temperature detection means 29 so that the peak value of the drive current of the capacitor 24 may fall within the allowable working range of FIG. 3(*c*) (according to the characteristic curve 35). As in Embodiment 1, moreover, the contact-closing thyristor 25 or the contact-opening thyristor 26, as instructed with the gate signal from the gate pulse unit 31, is turned ON to close or open the individual contacts 15*a* and 15*b*.

Thus, the switching actions can be stabilized by controlling the temperature of the capacitor 24 to fall within the predetermined range by the temperature control means 41, so that the peak valve of the drive current of the capacitor 24 may fall within the allowable working range.

Embodiment 3

Figure 6:
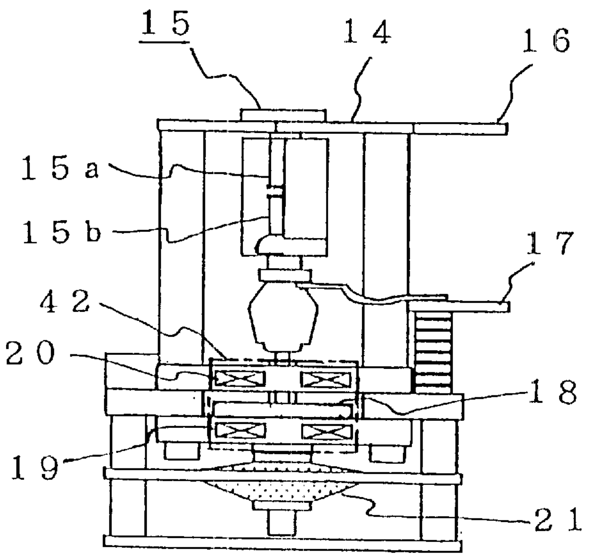
FIG. 6 is a construction diagram showing an essential portion of Embodiment 3 of this invention in a contact-opening (or opening) state.
Figure 7:
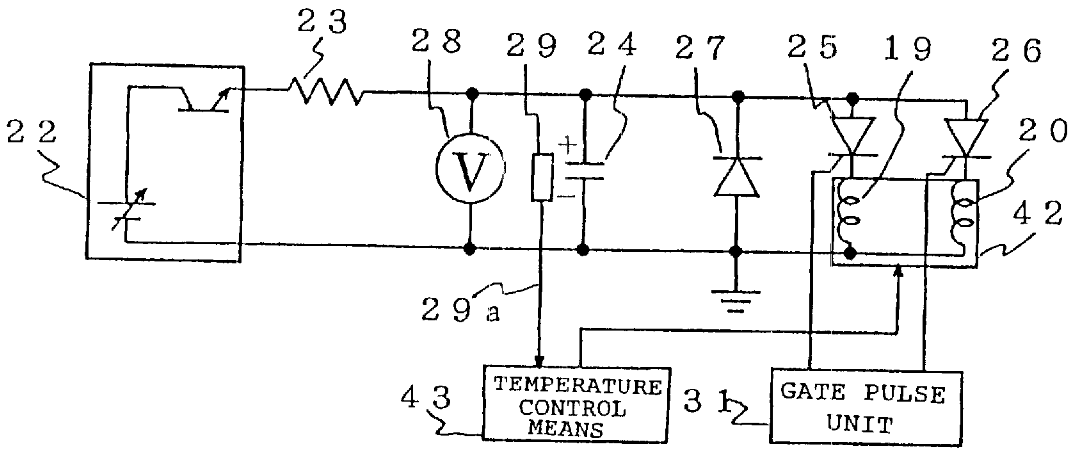
FIG. 7 is a drive circuit diagram of FIG. 6.

FIG. 6 is a construction diagram showing an essential portion of Embodiment 3 in the contact-opening (or open) state, and FIG. 7 is a drive circuit diagram of FIG. 6. In FIGS. 6 and 7, the components 14 to 29 and 31 are similar to those of a Embodiment 1. In FIGS. 6 and 7, numeral 42 designates a temperature control chamber which accommodates the individual coils 19 and 20 and the repulsion member 18. Numeral 43 designates temperature control means which receives the temperature signal 29*a* and controls the temperature of the temperature control chamber 42 according to the temperature of the capacitor 24.

Here will be described the actions. In FIGS. 6 and 7, the temperature control means 43 controls the temperature of the temperature control chamber 42 with the temperature signal 29*a*. When the temperature of the capacitor 24 is lowered by the influences of the peripheral temperature, the impedance of the capacitor 24 increases. In order to compensate the increase in the impedance of the capacitor 24, the temperature control chamber 42 is cooled to lower the temperatures of the individual coils 19 and 20 thereby to reduce the resistances.

When the temperature of the capacitor 24 rises, on the other hand, the temperature control chamber 42 is heated to raise the temperatures of the individual coils 19 and 20 thereby to compensate the drops of the impedance of the capacitor 24.

As described above, the temperatures of the individual coils 19 and 20 are so controlled by the temperature control means 43 that the fluctuations in the impedance of the capacitor 24 may be compensated by detecting the temperature of the capacitor 24. As a result, the drive current of the capacitor 24 can be confined within the allowable working range, as indicated by the characteristic curve 35, of FIG. 3(*c*), so that the switching actions can be stabilized.

If the charge of the capacitor 24 is completed in Embodiment 3, the charge current is equal to the leakage current of the capacitor 24. Moreover, it has been well known that the leakage current increases due to the aging. Specifically, the characteristic curve 39 of FIG. 4 is shifted upward due to the aged deterioration.

Accordingly from the temperature signal 29*a* of the temperature detection means 29 having the working temperature of the capacitor 24 and the detected leakage current, the electrostatic capacity of the capacitor 24 is calculated by the temperature control means 43. When the electrostatic capacity calculated at the working temperature is short, moreover, the temperature control means 43 controls the temperature of the temperature control chamber 42 to control the temperatures of the individual coils 19 and 20. As a result, the resistances of the individual coils 19 and 20 can be controlled to compensate the fluctuations of the electrostatic capacity of the capacitor 24 thereby to confine the drive current of the capacitor 24 within the allowable working range, as indicated by the characteristic curve 35 in FIG. 3(*c*), so that the switching actions can be stabilized.

In connection with Embodiment 3, moreover, here will be described the control of the temperature of the temperature control chamber 42, as will be made by detecting the drive current of the capacitor 24. First of all, the drive currents of the individual coils 25 and 26, as outputted from the capacitor 24, are detected by the current detection means (not-shown). Then, the working temperature of the capacitor 24 is calculated from the characteristic curve 34 of FIG. 3(*c*), and the electrostatic capacity and the equivalent series resistance are calculated from FIGS. 3(*a*) and 3(*b*). The switching actions can be stabilized by controlling the temperature of the temperature control chamber 42 to control the resistances of the individual coils 19 and 20 so that the drive current may fall within the allowable working range, as indicated by the characteristic curve 35, of FIG. 3(*c*). In this case, in order to set the temperature of the temperature control chamber 42, it is necessary to operate the individual coils 19 and 20 with the drive current of the capacitor 24. Therefore, the drive current cannot be detected before the gate signals of the individual thyristor switches 25 and 26. Therefore, an application can be made for setting at the time of the periodic inspection.

Embodiment 4

Figure 8:
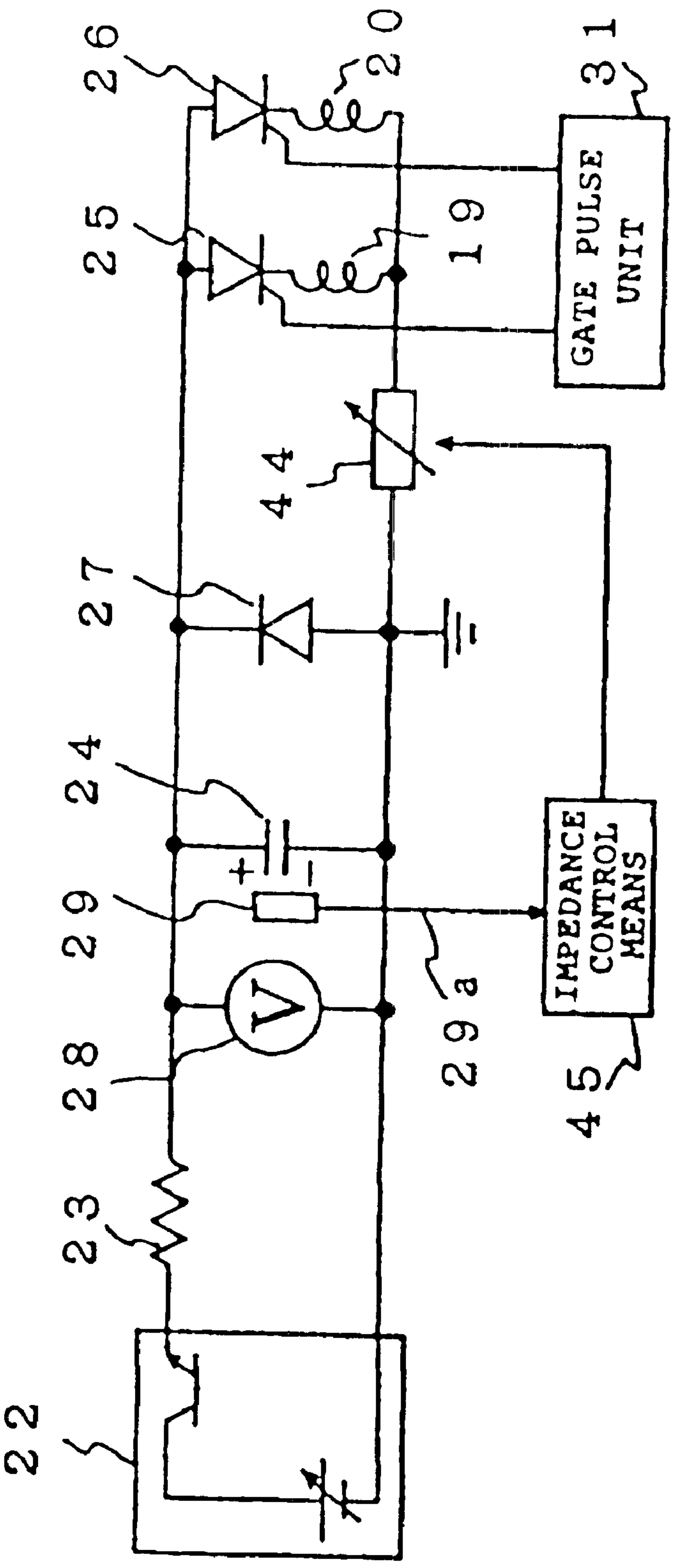
FIG. 8 is a drive circuit diagram of Embodiment 4 of this invention.

A construction diagram of Embodiment 4 is similar to that of FIG. 1 in Embodiment 1. FIG. 8 is a drive circuit diagram of Embodiment 4. In FIGS. 1 and 8, the components 1 to 29 and 31 are similar to those of Embodiment 1. Numeral 44 designates a variable impedance which is connected between the capacitor 24 and the individual coils 19 and 20 and which is constructed to have a variable resistance and a variable inductance. Numeral 45 designates impedance control means which receives the temperature signal 29*a* from the temperature detection means 29 and controls the variable impedance according to the temperature signal 29*a*.

Here will be described the actions. In FIGS. 1 and 8, the impedance control means 45 controls the peak value of the drive current of the capacitor 24 with the temperature signal 29*a*. In response to the temperature signal 29*a*, specifically, the increment/decrement of the impedance of the capacitor 24 is calculated from FIGS. 3(*a*) and 3(*b*). In accordance with the increment/decrement of the impedance of the capacitor 24, moreover, the variable impedance 44 is controlled to bring the peak valve of the drive current of the capacitor 24 within the allowable working range of FIG. 3(*c*).

As has been described hereinbefore, the variable impedance 44 is connected with the individual coils 19 and 20 and is controlled so that the peak value of the drive current may fall within a predetermined allowable working range with respect to the temperature change of the capacitor 24. As a result, the switching actions can be stabilized.

Embodiment 4 has been described on the construction in which the variable impedance 44 is connected between the capacitor 24 and the individual coils 19 and 20. However, similar effects can be expected, even if the entire impedance is controlled to a predetermined value by connecting the variable resistor (not-shown) in parallel with the capacitor 24 to control the variable resistor (not-shown) according to the detected temperature of the capacitor 24.

Embodiment 1 to Embodiment 4 have been described on the construction in which the temperature of the capacitor 24 is detected by the temperature detection means 29, but the temperature of the capacitor 24 can be calculated from the charging current of the capacitor 24. When an electrolytic capacitor is applied to the capacitor 24, more specifically, the leakage current has a temperature dependency, as illustrated in FIG. 4. As shown in FIG. 2, there is metered the charging current of the capacitor 24, as outputted from the charging power source 22 through the charge resistor 23. In this case, the current value at the time when the charge of the capacitor 24 is completed is equal to the leakage current of the capacitor 24. By utilizing the temperature characteristics of the leakage current of the capacitor 24, as illustrated in FIG. 4, therefore, the temperature of the capacitor 24 can be calculated by the voltage control means 31. The temperature of the capacitor 24 can thus be detected by the temperature detection means 29 but can also be calculated by calculations.

In Embodiment 4, on the other hand, here will be described the control of the variable impedance, as will be made by calculating the decrease in the electrostatic capacitance due to the aged deterioration of the capacitor 24 from the leakage current of the capacitor 24. First of all, the charging current of the capacitor 24, as outputted from the charging power source 22 through the charge resistor 23, is detected by the current detection means (not-shown). If, in this case, the charge of the capacitor 24 is completed, the charging current is equal to the leakage current of the capacitor 24. Moreover, it is well known that the leakage current increases with the aging. From the temperature signal 29*a* of the temperature detection means 29 having the working temperature of the capacitor 24 and the detected leakage current, the electrostatic capacity of the capacitor 24 is calculated by the impedance control means 45. When the electrostatic capacity calculated at the working temperature is short, moreover, the impedance control means 45 controls the variable impedance 44 to compensate the fluctuations of the electrostatic capacity of the capacitor 24. As a result, the drive current to be outputted from the capacitor 24 can fall within the allowable working range, as indicated by the characteristic curve 35 in FIG. 3(*c*), so that the switching actions can be stabilized.

In Embodiment 4, moreover, here will be described the control of the variable impedance 44, as will be made by detecting the drive current of the capacitor 24. First of all, the drive currents of the individual coils 25 and 26, as outputted from the capacitor 24, are detected by the current detection means (not-shown). Then, the working temperature of the capacitor 24 is calculated from the characteristic curve 34 of FIG. 3(*c*), and the electrostatic capacity and the equivalent series resistance are calculated from FIGS. 3(*a*) and 3(*b*). In accordance with the electrostatic capacity and the equivalent series resistance calculated, the variable resistance and the variable inductance of the variable impedance 44 are controlled to cause the drive current to fall within the allowable working range, as indicated by the characteristic curve 35 indicated in FIG. 3(*c*), so that the switching actions can be stabilized. In this case, the individual coils 19 and 20 have to be operated by the drive current of the capacitor 24. Therefore, the drive current cannot be detected before the gate signals of the individual thyristor switches 25 and 26 are outputted. Thus, an application can be made for the setting at the time of a periodic inspection.

Embodiment 5

Figure 9:
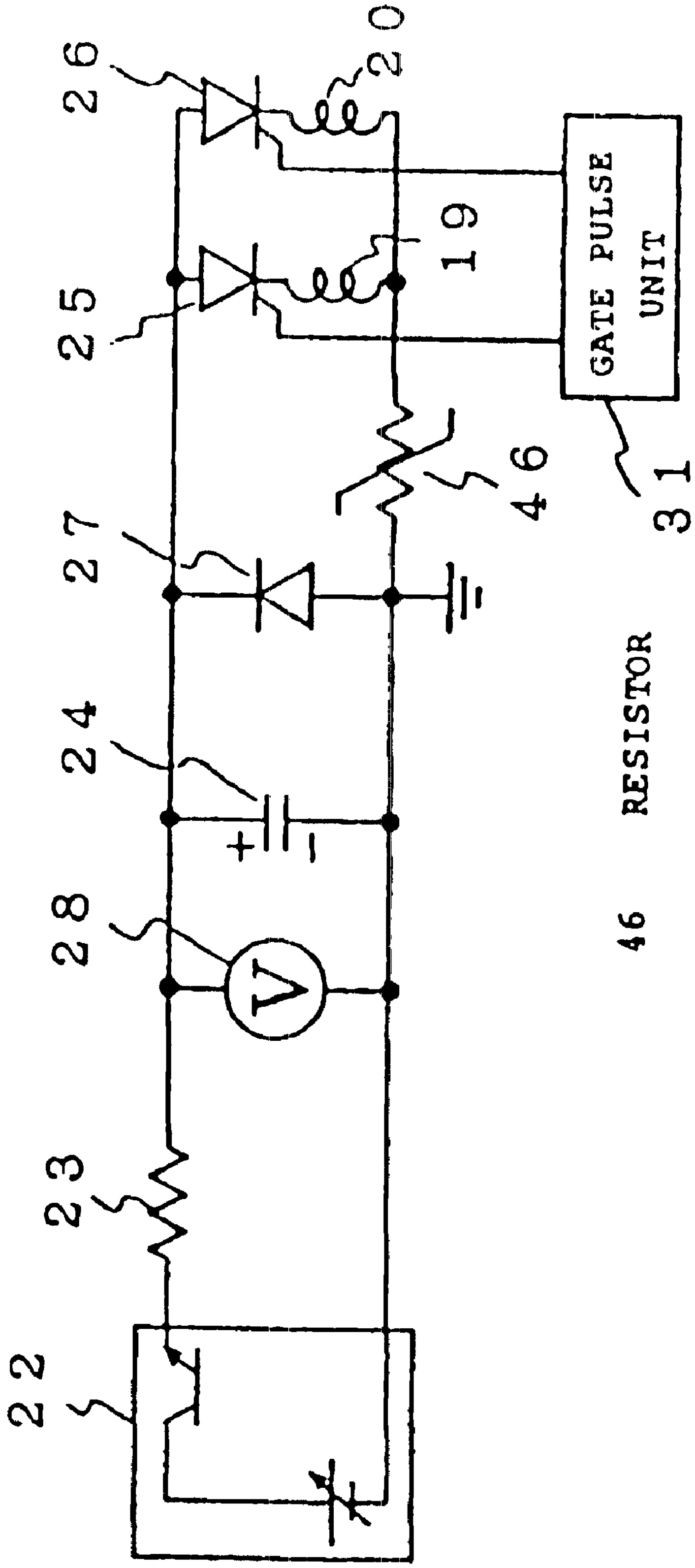
FIG. 9 is a drive circuit diagram of Embodiment 5 of this invention.

The construction diagram of Embodiment 5 is similar to that of FIG. 1 in Embodiment 1. FIG. 9 is a drive circuit diagram of Embodiment 5. In FIGS. 1 and 9, the components 1 to 28 and 31 are similar to those of Embodiment 1. Numeral 46 designates a resistor which is connected between the capacitor 24 and the individual coils 19 and 20 and which has a temperature dependency. This resistor 46 has characteristics reversed from those of the equivalent series resistor of the capacitor 24, as indicated in FIG. 3(*c*).

Here will be described the actions. In FIGS. 1 and 9, the capacitor 24 and the resistor 46 are arranged in the environment of the always identical ambient temperature so that the entire impedance is held at a generally constant level in a manner to correspond to the change in the ambient temperature.

As described above, the resistor 46 having the temperature dependency is connected with the individual coils 19 and 20 to compensate the impedance due to the temperature change of the capacitor 24 so that the peak value of the drive current may fall within a predetermined range. As a result, the switching actions can be stabilized.

Embodiment 6

Figure 10:
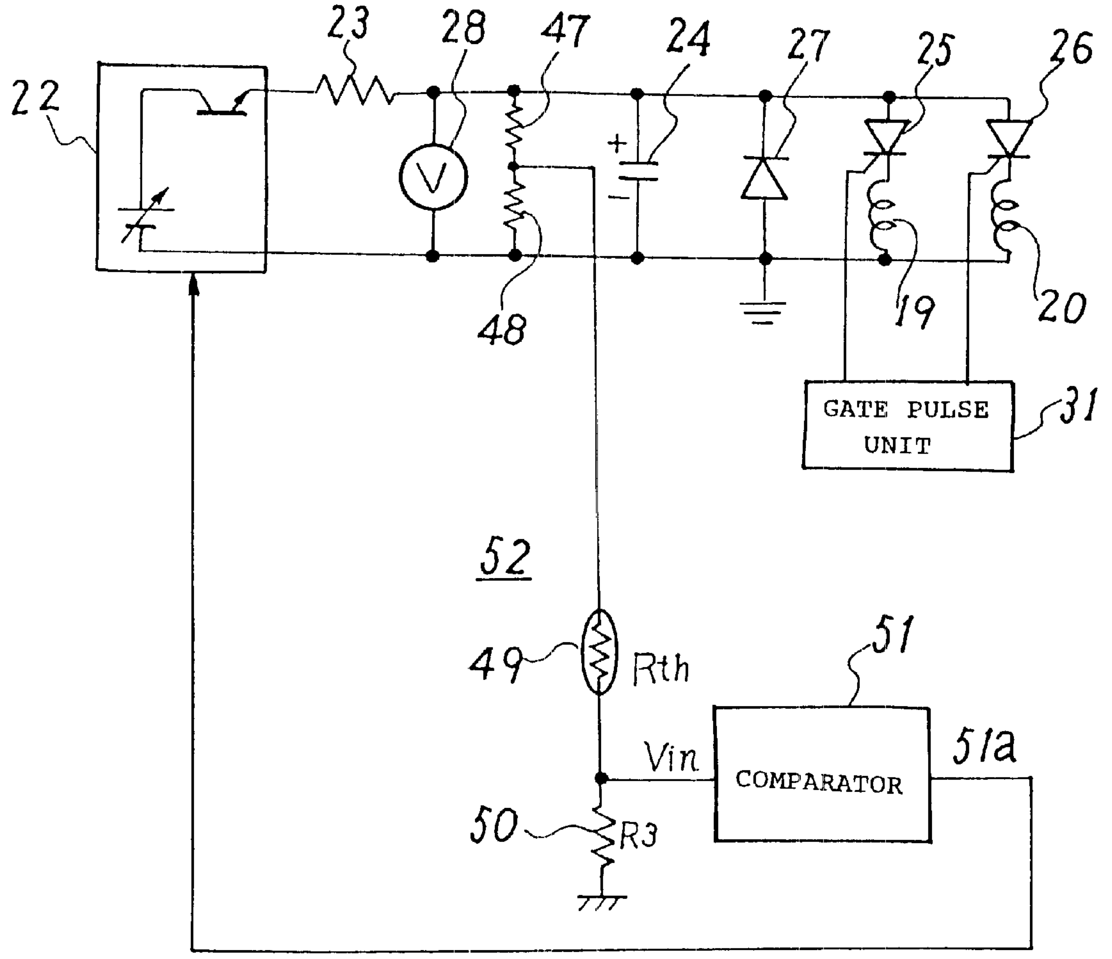
FIG. 10 is a drive circuit diagram of Embodiment 6 of this invention.
Figure 11:
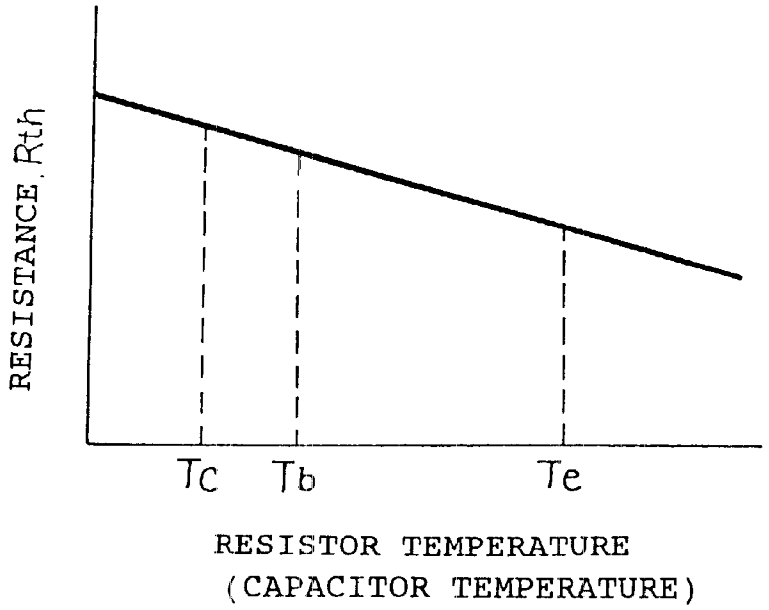
FIG. 11 is an explanatory diagram illustrating the temperature characteristics of a resistor having negative characteristics of FIG. 10.

A construction diagram of Embodiment 6 is similar to that of FIG. 1 in Embodiment 1. FIG. 10 is a drive circuit diagram of Embodiment 6. In FIGS. 1 and 10, the components 1 to 28 and 31 are similar to those of Embodiment 1. Here, the output voltage of the charging power source 22 is turned ON/OFF with the output signal 51*a* of a later-described comparator 51. Numerals 47 and 48 designate resistors which are connected in series with each other and in parallel with the capacitor 24. Numeral 49 designates a resistor such as a thermistor which is so arranged in the vicinity of the capacitor 24 as to have the same temperature as that of the capacitor 24 and which has such a temperature dependency of negative characteristics as indicated in FIG. 11. The resistor 49 is connected at its one end between the resistors 47 and 48. Numeral 50 designates a resistor which is connected between the other end of the resistor 49 and the earth. The numeral 51 designates the comparator which receives an input voltage Vin, as expressed by Formula (1). The comparator 51 outputs the output signal 51*a*, when the input voltage Vin is lower than a reference voltage Vref, but does not output the output signal 51*a* when the input voltage Vin is higher than the reference voltage Vref.

$$Vin = V \cdot R_2 \cdot R_3 / [R_1 \cdot \{R_2 + Rth(Ta) + R_3\} + R_2 \cdot \{Rth(Ta) + R_3\}] \quad (1)$$

Here: R1 designate the resistance of the resistor 47; R2 the resistance of the resistor 48; Rth(Ta) the resistance of the resistor 49 when the temperature of the resistor 49 (i.e., the temperature of the capacitor 24) is at Ta; R3 the resistance of the resistor 50; and V the charge voltage of the capacitor 24. Here, numerals 47 to 51 construct voltage control means 52.

Here will be described the actions. In FIGS. 1, 10 and 11, the output signal 51*a* is not outputted from the comparator 51 when the input voltage Vin is higher than the reference voltage Vref. Therefore, the capacitor 24 is not charged by the charging power source 22.

Here, the voltage of the capacitor 24 is gradually lowered by the discharge through the resistors 47 and 48 or by the leakage current of the capacitor 24. When the input voltage Vin becomes lower than the reference voltage Vref, moreover, the output signal 51*a* is outputted from the comparator 51. In response to this output signal 51*a*, the capacitor 24 is charged by the charging power source 22. By thus turning "ON" and "OFF" the charging power source 22, the input voltage Vin is controlled within a predetermined range around the reference voltage Vref. If the input voltage Vin of Formula (1) is replaced by the reference voltage Vref, therefore, the charge voltage V of the capacitor 24 is expressed by Formula (2).

$$V = Vref \cdot [R_1 \{R_2 + Rth(Ta) + R_3\} + R_2 \cdot \{Rth(Ta) + R_3\}] / R_2 \cdot R_3 \quad (2)$$

Figure 12:
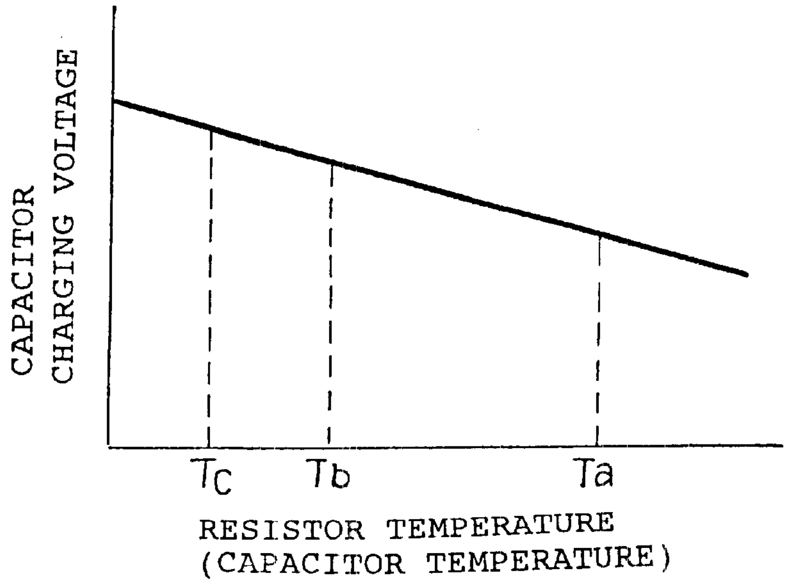
FIG. 12 is an explanatory diagram illustrating a relation between the temperature of a resistor (or capacitor) having negative characteristics of FIG. 10 and a charging voltage of the capacitor.

In FIG. 11, when the temperature of the capacitor 24 becomes lower from Ta to Tb, the resistance of the resistor 49 becomes Rth(Tb) higher than Rth(Ta). As a result, the charging voltage V of the capacitor 24 is raised by Formula (2), so that the relation between the temperature of the resistor 49 (or the capacitor 24) and the charging voltage of the capacitor 24 is obtained, as illustrated in FIG. 12.

Here, Formula (2) is expressed by Formula (4) if a resistance ratio Rr is defined by Formula (3).

$$Rr = [R_1 \cdot \{R_2 + Rth(Ta) + R_3\} + R_2 \cdot \{Rth(Ta) + R_3\}] / R_2 \cdot R_3 \quad (3)$$

$$V = Vref \cdot Rr \quad (4)$$

Thus, the charge voltage of the capacitor 24 can be expressed as the product of the reference voltage Vref and the resistance ratio Rr. Moreover, the numerator of Formula (3) for calculating the resistance ratio Rr contains the resistance of the resistor 49 having a temperature dependency of negative characteristics.

Figure 13:
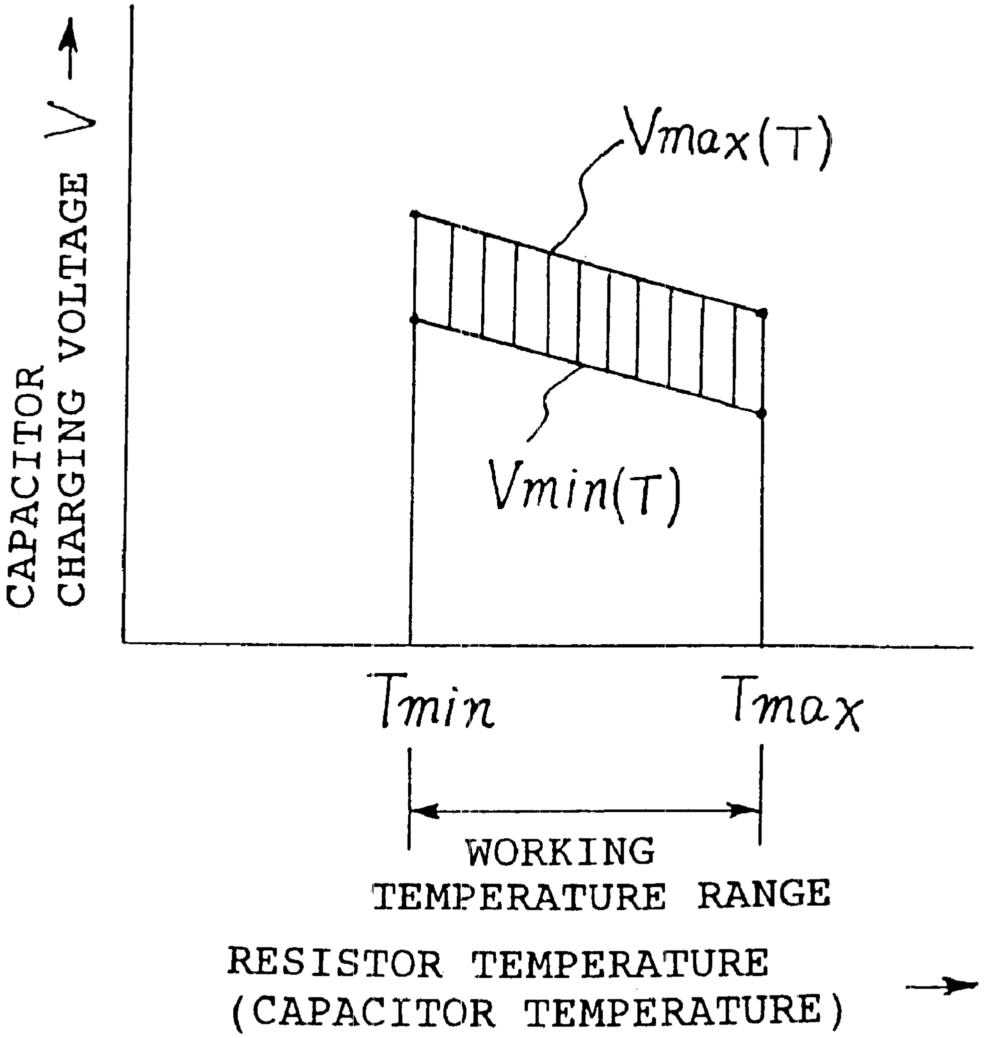
FIG. 13 is an explanatory diagram showing a method of determining a reference voltage of FIG. 10.

The reference voltage Vref is determined in the following manner. Within the working temperature range (Tmin to Tmax), as shown in FIG. 13, the upper limit Vmax(T) and the lower limit Vmin(T) of the charge voltage V of the capacitor 24 for the device to work normally are set by experiments, analyses and so on.

Next, as the individual temperatures (T) within the working temperature ranges, the reference voltages Vref, $R_1$, $R_2$, $R_3$ and Rth of Formula (2) are so selected that the charge voltage V(T) of the capacitor 24 may satisfy $Vmin < V(T) < Vmax(T)$.

As described above, the charge voltage V of the capacitor 24 is controlled as the product of the reference voltage Vref and the resistance ratio Rr, and the resistance of the resistor 49 having a resistance of a temperature dependency of negative characteristics is contained in the numerator of the Formula for calculating the resistance ratio Rr. As a result, the drive current to be outputted from the capacitor 24 can be confined within the allowable working range, as indicated by the characteristic curve 35 in FIG. 3(*c*) by controlling the output voltage of the charging power source 22 with the voltage control means 52.

Embodiment 7

Figure 14:
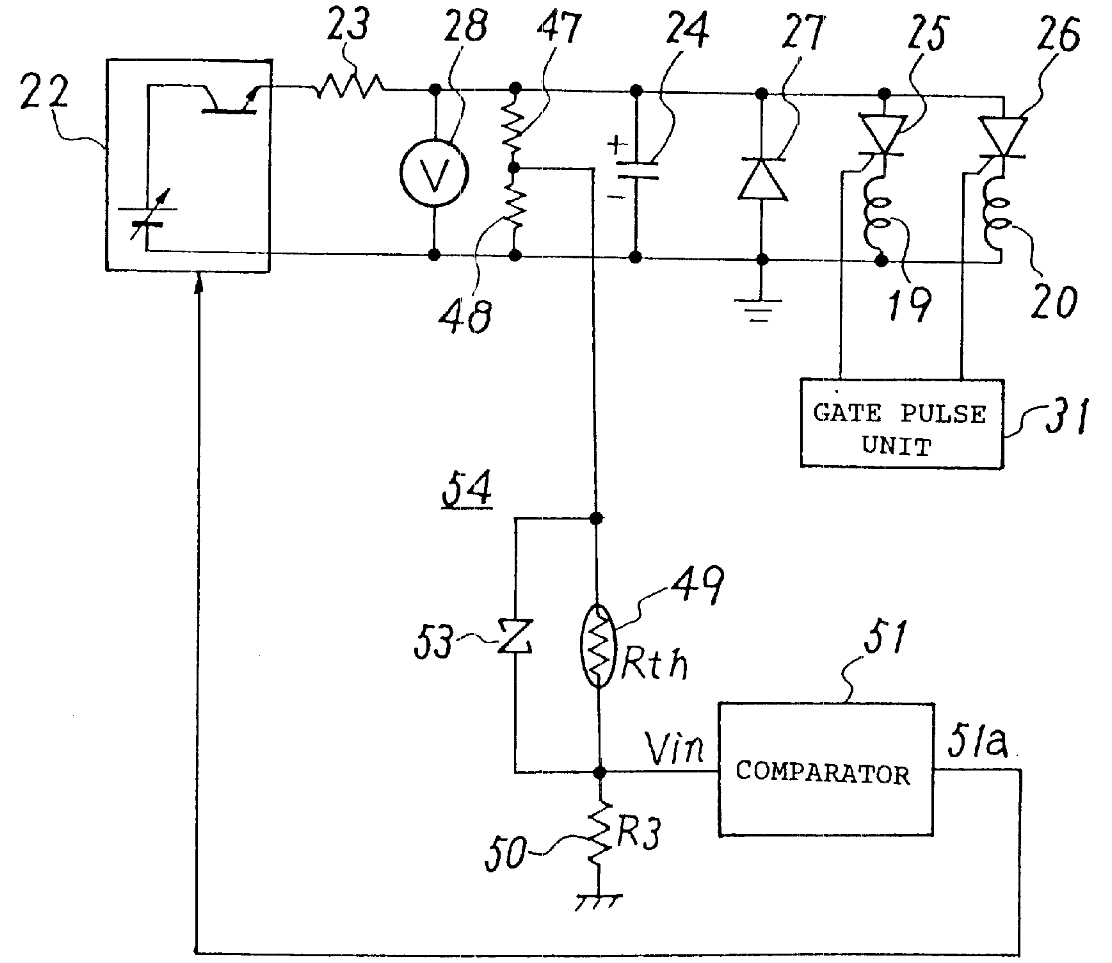
FIG. 14 is a drive circuit diagram of Embodiment 7 of this invention.

The construction diagram of Embodiment 7 is similar to that of FIG. 1 of Embodiment 1. FIG. 14 is a drive circuit diagram of Embodiment 7. In FIGS. 1 and 14, the components 1 to 28 and 31 are similar to those of Embodiment 1, and the components 47 to 51 are similar to those of Embodiment 6. Numeral 53 designates a voltage suppression element such as a zinc oxide element or a Zener diode which is connected between the ends of the resistor 49. Here, the components 47 to 51 and 53 construct voltage control means 54.

Figure 15:
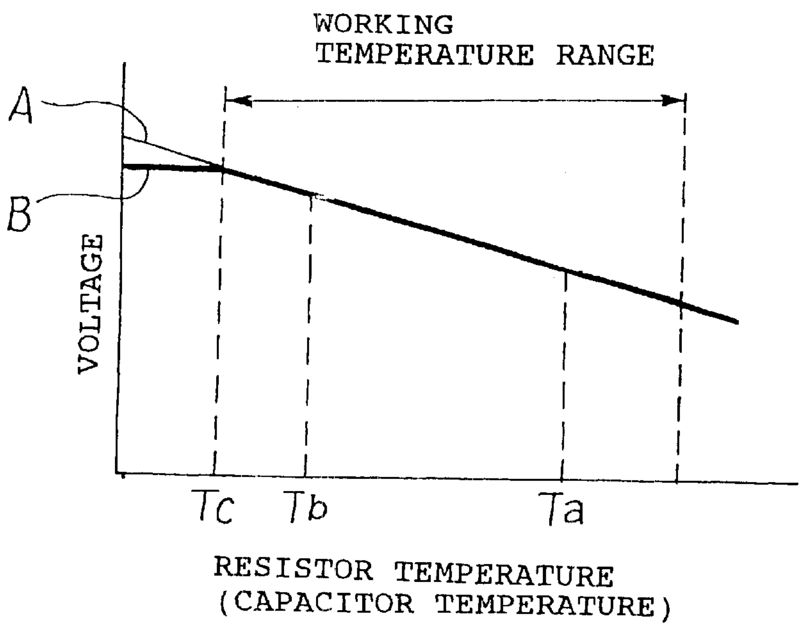
FIG. 15 is an explanatory diagram illustrating a relation between the temperature of the resistor having the negative characteristics of FIG. 13 and the charging voltage of the capacitor.

Here will be described the actions. Without the voltage suppression element 53 in FIG. 15, the voltage of the resistor 49 is indicated by a characteristic curve A of FIG. 14 according to the temperature characteristics of the resistor 49.

Here, if the temperature of the capacitor 24 (or the resistor 49) is lower than the limit working minimum temperature Tc, the voltage of the resistor 49 rises so that the voltage suppression element 53 acts to drop the impedance abruptly. Then, the voltage between the ends of the resistor 49 exhibits a constant value, as indicated by a characteristic curve B in FIG. 15. As a result, the impedance corresponding to the Rth(Ta) in Formula (2), that is, the impedance between the ends of the resistor 49 does not rise so that the charge voltage V of the capacitor 24 is prevented from rising.

Figure 16:
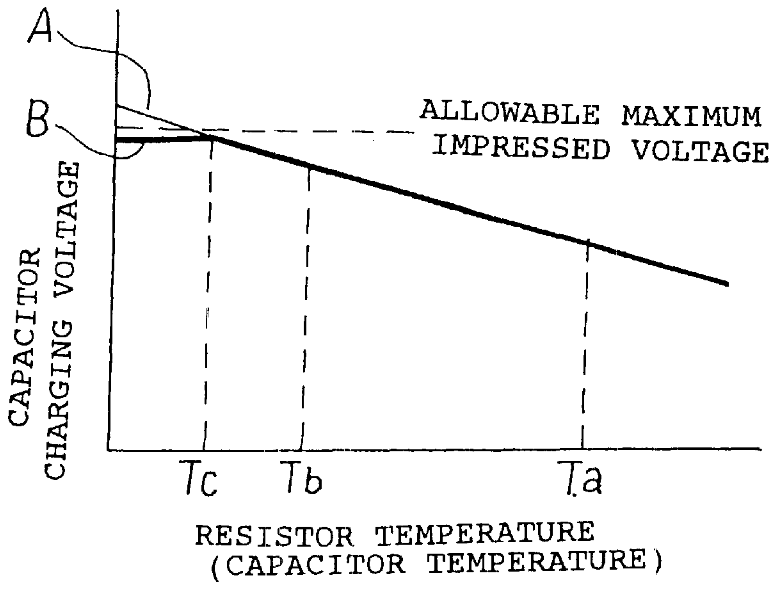
FIG. 16 is an explanatory diagram illustrating a relation between the temperature of the resistor (or capacitor) having the negative characteristics of FIG. 13 and the charging voltage of the capacitor.

Without the voltage suppression element 53, the charge voltage V of the capacitor 24 is raised, as indicated by the characteristic curve A in FIG. 16, by Formula (2). At the temperature Tc or lower, however, the impedance between the ends of the resistor 49 is not raised by the voltage suppression element 53 so that the control is made not to exceed the allowable maximum impressed voltage, as indicated by the characteristic curve B in FIG. 16, by Formula (2).

By connecting the voltage suppressing voltage suppression element 53 in parallel with the resistor 49 having the temperature dependency, as has been described hereinbefore, the voltage suppression element 53 can act to control the impedance between the ends of the resistor 49 even below the limit working minimum temperature Tc of the capacitor 24. As a result, the charge voltage V of the capacitor 24 can be made at the allowable maximum impressed voltage or lower.

Embodiment 8

Figure 17:
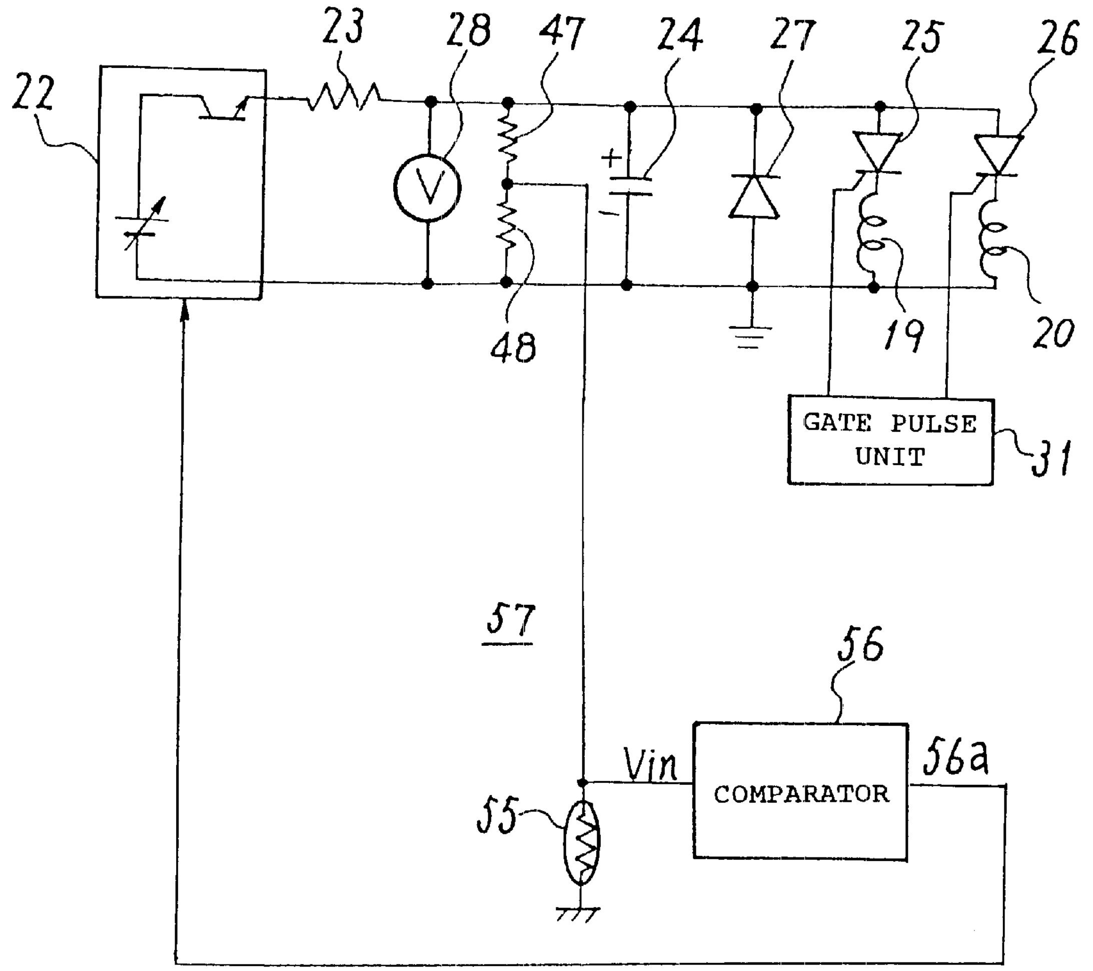
FIG. 17 is a drive circuit diagram of Embodiment 8 of this invention.
Figure 18:
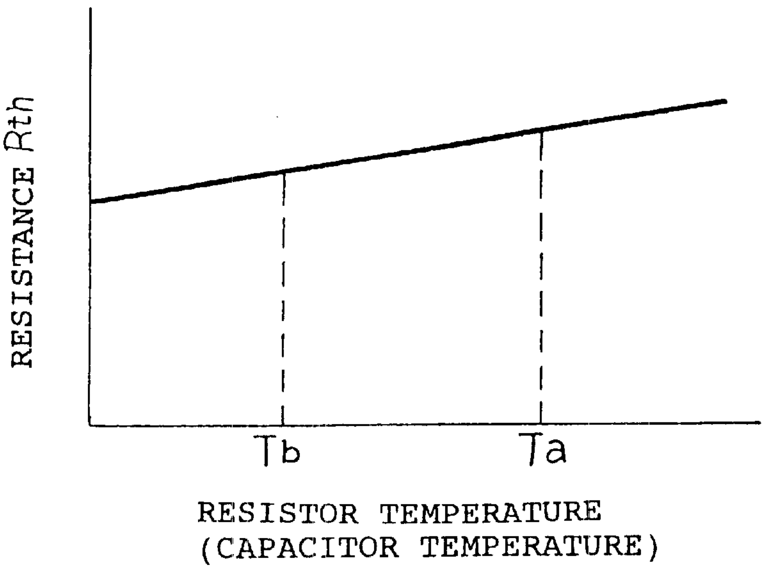
FIG. 18 is an explanatory diagram illustrating the temperature characteristics of the resistor having the negative characteristics of FIG. 16.

The construction diagram of Embodiment 8 is similar to that of FIG. 1 of Embodiment 1. FIG. 17 is a drive circuit diagram of Embodiment 8. In FIGS. 1 and 17, the components 1 to 28 and 31 are similar to those of Embodiment 1, and the components 47 and 48 are similar to those of Embodiment 6. Numeral 55 designates a resistor such as a thermistor which is so arranged in the vicinity of the capacitor 24 as to have the same temperature as that of the capacitor 24 and which has a temperature dependency of positive characteristics, as indicated in FIG. 18. The resistor 55 is connected at its one end between the individual resistors 47 and 48 and is grounded at its other end to the earth. Numeral 56 designates a comparator which receives the input voltage Vin, as expressed by Formula (5), to output an output signal 56*a*, when the input voltage Vin is lower than the reference voltage Vref, but not the output signal 56*a* when the input voltage Vin is higher than the reference voltage Vref $$Vin=V\cdot Rth(Ta)\cdot R_2/\{Rth(Ta)\cdot R_1+Rth(Ta)\cdot R_2+R_1\cdot R_2\} \quad (5)$$

Here: V designates the charge voltage of the capacitor 24; Rth(Ta) the resistance of the resistor 55 when the temperature of the resistor 55 (i.e., the temperature of the capacitor 24) is at Ta degrees; R1 the resistance of the resistor 47; and R2 the resistance of the resistor 48. Here, the components 47, 48, 55 and 56 construct voltage control means 57.

Here will be described the actions. In FIGS. 1, 17 and 18, when the input voltage Vin is higher than the reference voltage Vref, the output signal 56*a* is not outputted from the comparator 56. As a result, the capacitor 24 is not charged by the charging power source 22.

Here when the input voltage Vin corresponding to the charge voltage of the capacitor 24 becomes lower than the reference voltage Vref, the output signal 56a is outputted from the comparator 56. The charging power source 22 is turned "ON" by the output signal 56*a*, the capacitor 24 is charged. By thus turning "ON" and "OFF" the charging power source 22, the input voltage Vin is controlled within a predetermined range around the reference voltage Vref. If the input voltage Vin of Formula (5) is replaced by the reference voltage Vref, therefore the charge voltage V of the capacitor 24 is expressed by Formula (6).

$$V=Vref\cdot\{Rth(Ta)\cdot R_1+Rth(Ta)\cdot R_2+R_1\cdot R_2\}/Rth(Ta)\cdot R_2 \quad (6)$$

Figure 19:
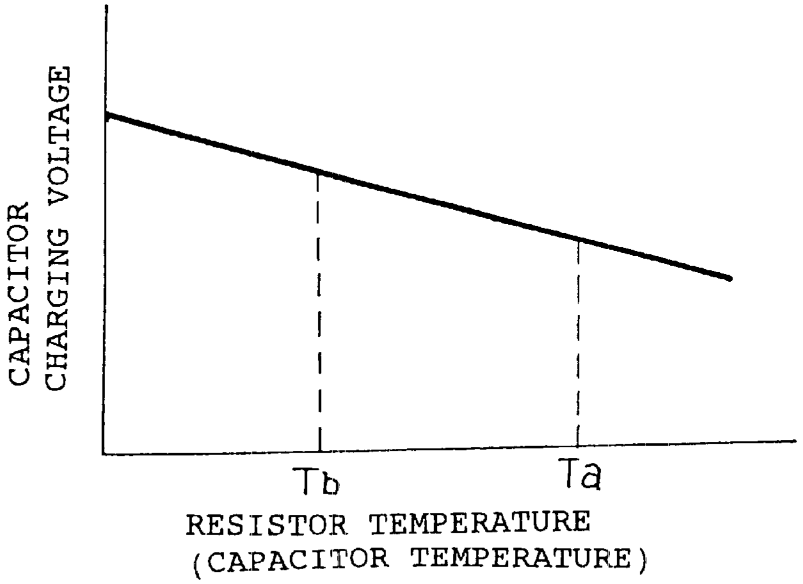
FIG. 19 is an explanatory diagram illustrating the relation between the a temperature of a resistor having positive characteristics of FIG. 16 and the charging voltage of the capacitor.

As the temperature of the capacitor 24 is lowered from Ta to Tb, as illustrated in FIG. 18, the resistor 55 takes the resistance Rth(Tb) lower than Rth(Ta). As a result, the relation between the temperature of the resistor 55 (or the capacitor 24) and the charge voltage of the capacitor 24 is obtained, as illustrated in FIG. 19.

As described above, the charge voltage V of the capacitor 24 is controlled as the product of the reference voltage Vref and the resistance ratio Rr, as expressed by Formula (7), and the resistance of the resistor 55 having the resistance of the temperature dependency of positive characteristics is contained in the denominator of Formula (8) for calculating the resistance ratio Rr. By controlling the charge voltage of the capacitor 24 by the voltage control means 56, the drive current to be outputted from the capacitor 24 can be confined within the allowable working range, as indicated by the characteristic curve 35 in FIG. 3(*c*).

$$V = Vref\cdot Rf \quad (7)$$

$$\begin{aligned} Rr &= \{Rth(Ta)\cdot R_1 + Rth(Ta)\cdot R_2 + R_1\cdot R_2\}/Rth(Ta)\cdot R_2 \quad (8)\\ &= \{R_1 + R_2 + R_1\cdot R_2/Rth(Ta)\}\cdot 1/R_2 \end{aligned}$$

Embodiment 6 to Embodiment 8 have been described on the case in which the resistor 49 and 55 having the temperature dependency are connected at their one end connected between the resistors 47 and 48 which are connected between the two ends of the capacitor 24. However, similar effects can be expected even if the one end is connected from the positive side of the capacitor 24 through the series resistors (not-shown).

Embodiment 9

Figure 20:
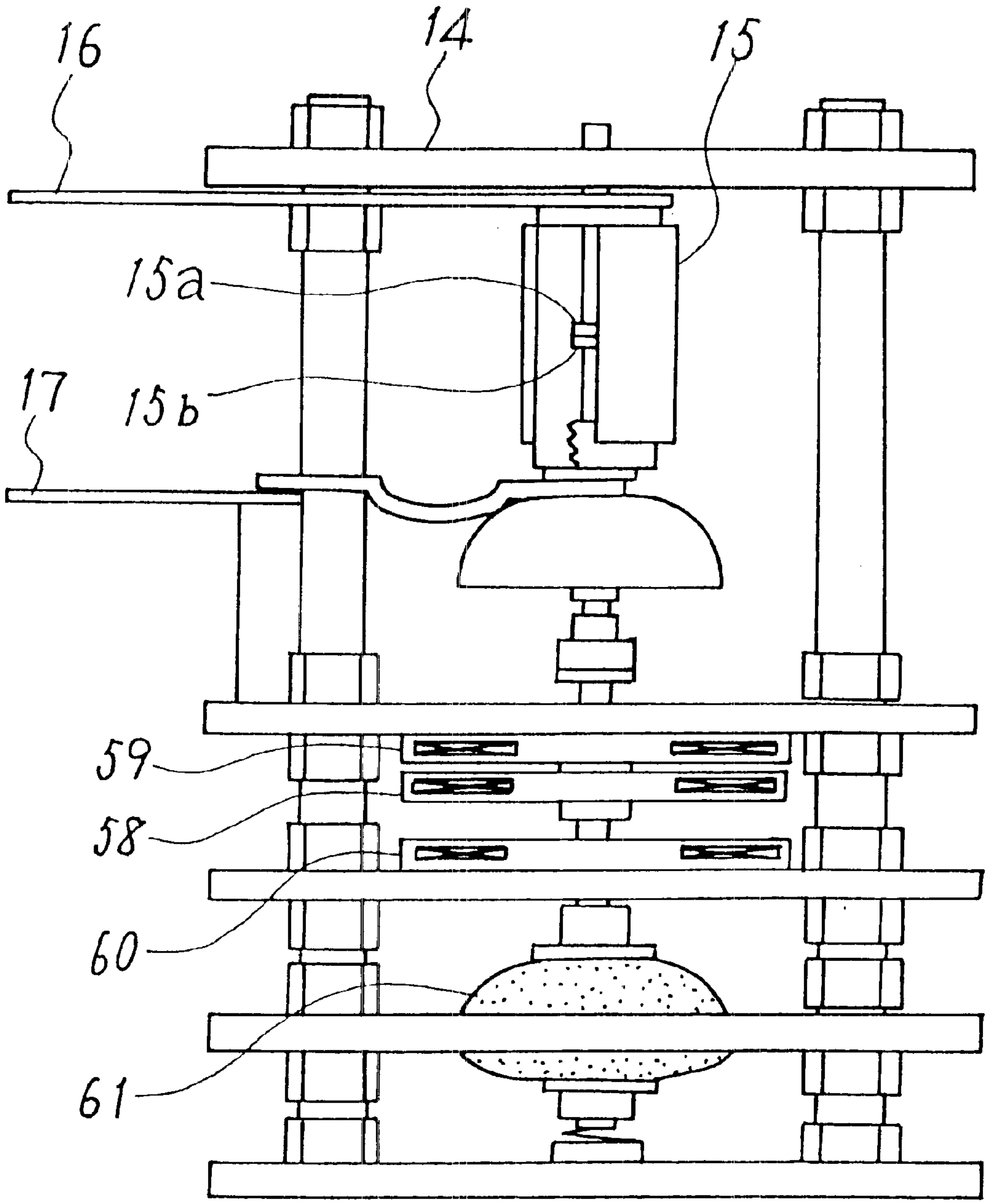
FIG. 20 is a construction diagram showing a switching device of Embodiment 9 of this invention.
Figure 21:
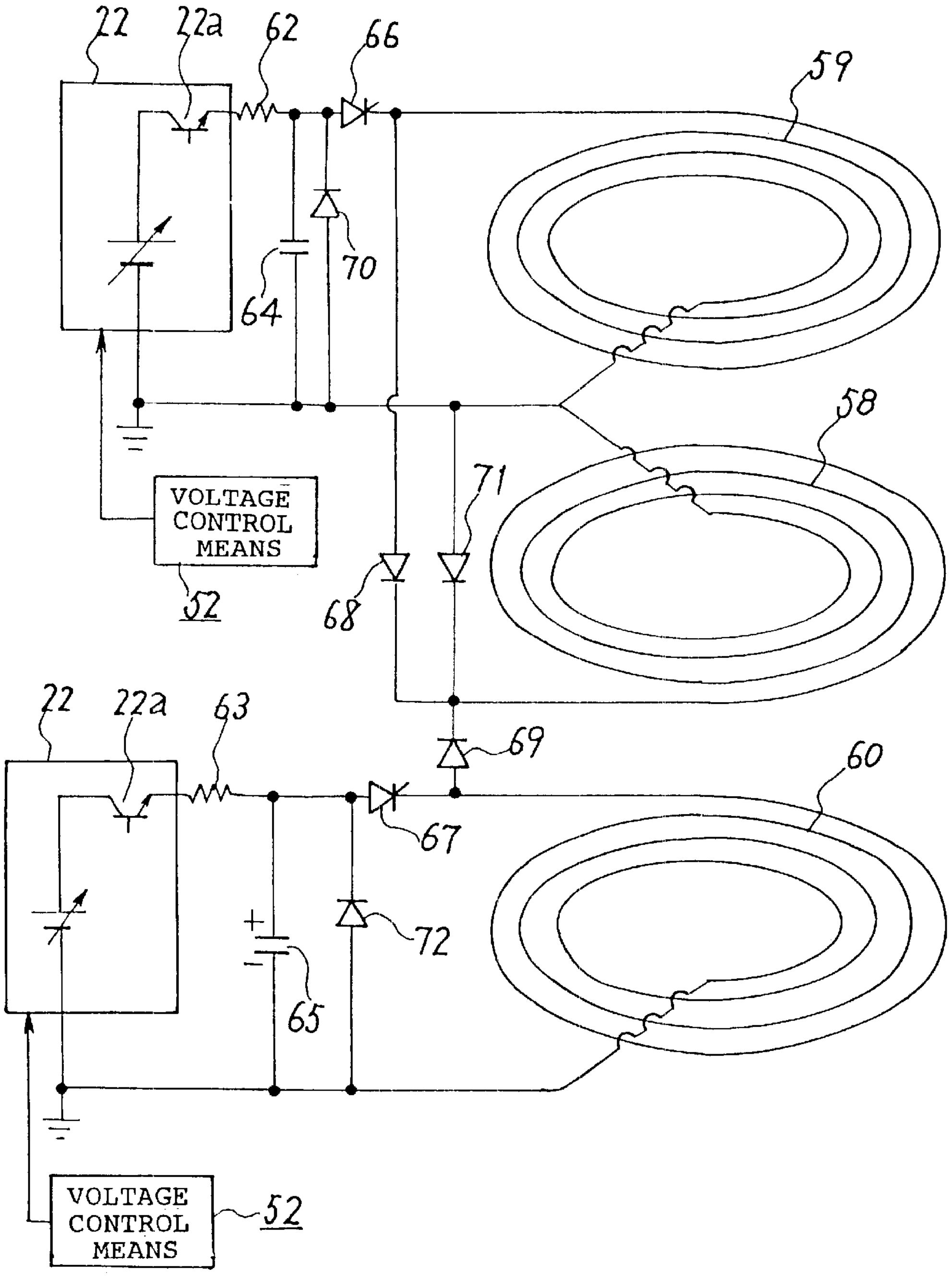
FIG. 21 is a drive circuit diagram of FIG. 19.
Figure 22:
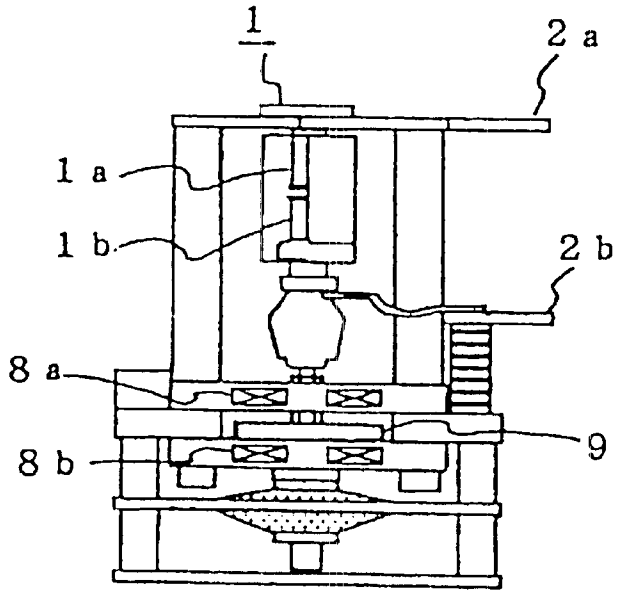
FIG. 22 (PRIOR ART)
FIG. 22 is a construction diagram of the electromagnetic repulsion drive switching device of the prior art.
Figure 23:
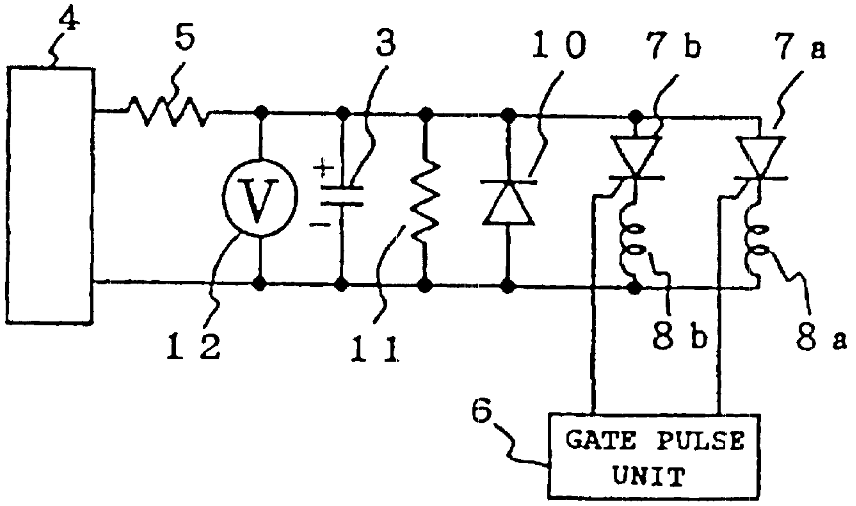
FIG. 23 (PRIOR ART)
FIG. 23 is a drive circuit diagram of FIG. 22.
Figures 24A, 24B, 24C, 24D:
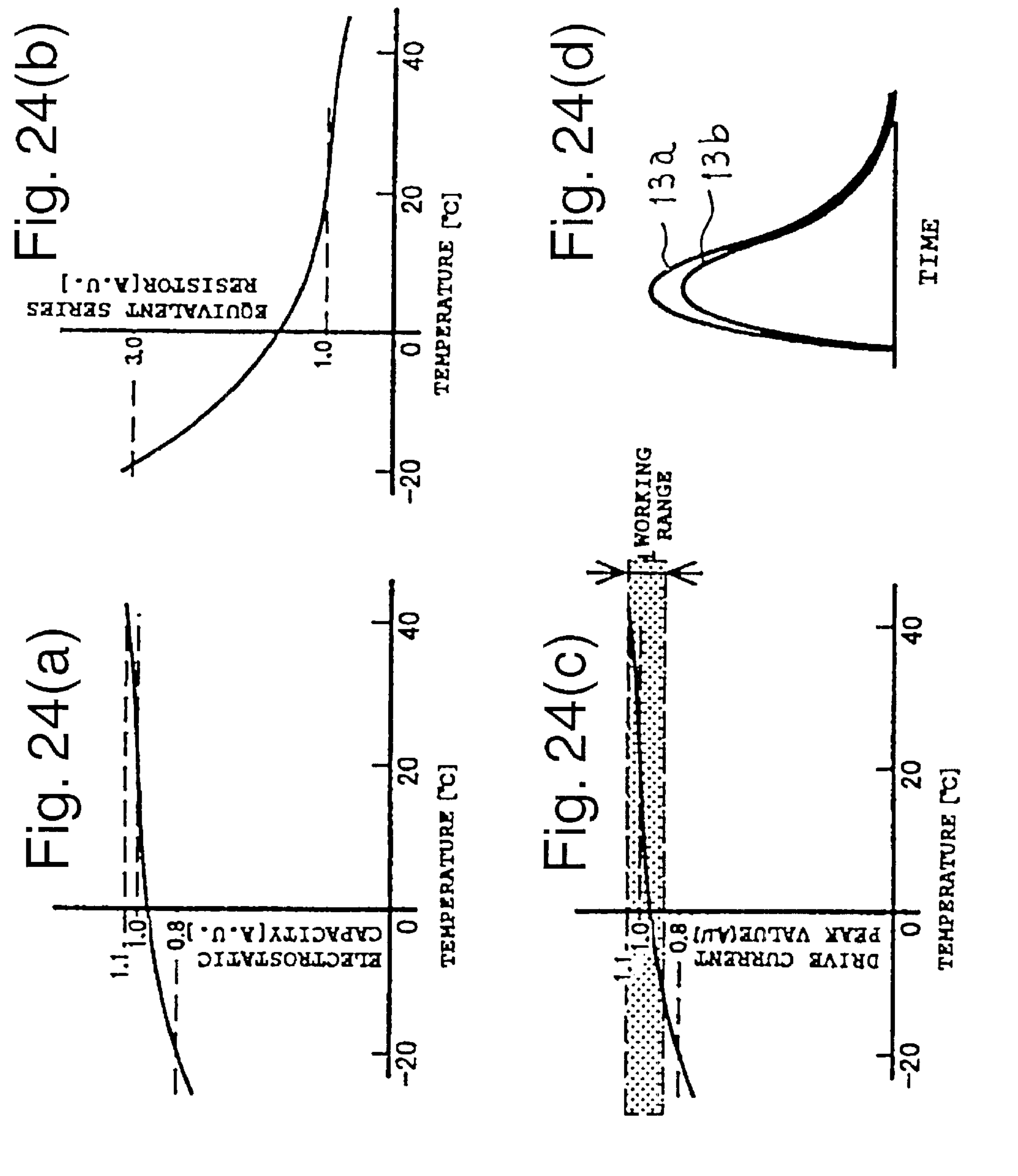
FIGS. 24(*a*)–24(*d*) are explanatory diagrams illustrating the temperature characteristics of the electrostatic capacity of the capacitor of FIG. 22.

FIG. 20 is a construction diagram showing a switching device of Embodiment 9, and FIG. 21 is a drive circuit diagram of Embodiment 9. In FIGS. 20 and 21, the components 14 to 17 and 22 are similar to those of Embodiment 1, and the component 52 is similar to that of Embodiment 1. Numeral 58 designates a repulsion member which is fixed on the movable contact 15*b* and which is fed with drive currents from later-described capacitors 64 and 65. Numeral 59 designates an contact-opening coil which is fixed on the frame 14 and which is arranged to confront the repulsion member 58 and fed with the drive current from the later-described capacitor 64. Numeral 60 designates a contact-closing coil which is fixed on the frame 14 and which is so arranged on the side opposed to the contact-opening coil 59 as to confront the repulsion member 58 and fed with the drive current from the later-described capacitor 65. Numeral 61 designates a spring which pushes the movable contact 15*b* onto the stationary contact 15*a* when the individual contacts 15*a* and 15*b* are closed (to contact). Numerals 62 and 63 designate charge resistors, and the numeral 64 designates a contact-opening capacitor which is charged through the charge resistor 62 and which feeds the drive current to the contact-opening coil 59 and the repulsion member 58. The numeral 65 designates the contact-closing capacitor which is charged through the charge resistor 63 and which feeds the drive current to the contact-closing coil 60 and the repulsion member 58. Numeral 66 designates a contact-opening discharge switch which is made of a semiconductor element; numeral 67 designates a contact-closing discharge switch which is made of a semiconductor element; and numeral 68 designates a connection diode which connects the contact-opening coil 59 and the repulsive member 58. Numeral 69 designates a connection diode which connects the contact-closing coil 60 and the repulsion member 58. Numeral 70 designates a diode which is connected in parallel with the contact-opening coil 59 and which releases the electromagnetic energy stored in the contact-opening coil 59.

Numeral 71 designates a diode which is connected in parallel with the repulsion coil such as the repulsion member 58 and which releases the electromagnetic energy stored in the repulsion coil (or the repulsion member 58). Numeral 72 designates a diode which is connected in parallel with the contact-closing coil 60 and which releases the electromagnetic energy stored in the contact-closing coil 60.

Here will be described the actions. In FIGS. 20 and 21, when the contact-opening discharge switch 66 is turned ON, a pulse current flows from the contact-opening capacitor 64 through the discharge switch 66 to the contact-opening coil 59 so that a magnetic field is generated. Moreover, the pulse current also flows through the connection diode 68 to the repulsion member 58 so that a magnetic field reversed to that generated in the contact-opening coil 59 is generated. As a result, the repulsion member 58 is caused to receive the electromagnetic repulsion force, as directed downward of the Drawing, by the interactions of the magnetic fields. Moreover, the movable contact 15*b*, fixed on the repulsion member 58, is pulled down so that the two contacts 15*a* and 15*b* leave each other to open the contacts of the vacuum valve 15. After the pulse current was interrupted, the electromagnetic energy stored in the contact-opening coil 59 circulates from the diode 70 and the contact-opening discharge switch 66 through the contact-opening coil 59 so that it is gradually attenuated. On the other hand, the electromagnetic energy stored in the repulsion member 58 circulated from the diode 71 through the repulsion member 58 so that it is gradually attenuated.

When the contact-closing discharge switch 67 is then turned ON, the pulse current flows from the contact-closing capacitor 65 through the contact-closing discharge switch 67 to the contact-closing coil 60 so that a magnetic field is generated. Moreover, the pulse current also flows through the connection diode 69 to the repulsion member 58 so that a magnetic field, as reversed from that generated in the contact-closing coil 60, is generated.

As a result, the repulsion member 58 is caused to receive the electromagnetic repulsion force, as directed upward of the Drawing, by the interactions of the magnetic fields. Then, the movable contact 15*b* fixed on the repulsion member 58 is pulled upward so that the two contacts 15*a* and 15*b* come into contact to close the vacuum valve 15. After the pulse current was interrupted, the electromagnetic energy, as stored in the contact-closing coil 60, circulates from the diode 72 and the contact-closing discharge switch 67 through the contact-closing coil 60 so that it is gradually attenuated. On the other hand, the electromagnetic energy, as stored in the repulsion member 58, circulated from the diode 71 through the repulsion member 58 so that it is gradually attenuated.

In the construction thus far described, as in Embodiment 6, the charge voltage V of the individual capacitors 64 and 65 is controlled as the product of the reference voltage Vref and the resistance ratio Rr by the voltage control means 52, and the resistance of the resistor having the resistance having the temperature dependency of the negative characteristics is contained in the numerator of the formula for calculating the resistance ratio Rr. By controlling the output voltage of the charging power source 22, the drive currents to be outputted from the individual capacitors 64 and 65 can be confined within the allowing working range, as indicated by the characteristic curve 35 in FIG. 3*c*.

Moreover, similar effects can be expected even if the charge voltage V of the individual capacitors 64 and 65 is controlled by the voltage control means 54 of Embodiment 7 and the voltage control means 57 of Embodiment 8.

INDUSTRIAL APPLICABILITY

Thus, the electromagnetic repulsion drive switching device according to this invention can make the stable switching actions so that it is suitably used by packaging it in the electric devices or electric facilities of various factories or buildings.

What is claimed is:

1. An electromagnetic repulsion drive switching device comprising:
- a contact-closing coil and a contact-opening coil;
- a conductive repulsion member confronting said contact-closing and contact-opening coils;
- a capacitor feeding a drive current to a selected one of said contact-closing and contact-opening coils, said capacitor having a capacitance and an equivalent series resistance varying with temperature;
- a charging power source generating an output voltage for charging said capacitor to a charge voltage to produce the drive current so that a stationary contact and a movable contact are brought into and out of contact by a repulsion electromagnetic force generated between one of said contact-closing and contact-opening coils and said repulsion member in response to flow of the drive current;
- temperature sensing means for outputting a temperature signal indicating temperature of said capacitor; and
- voltage control means for controlling the output voltage of said charging power source in response to the temperature signal so that a peak value of the drive current is within a working range when the temperature of said capacitor is within a working range.

2. The electromagnetic repulsion drive switching device as set forth in claim 1, wherein said voltage control means controls the output voltage of said charging power source so that when the temperature of said capacitor is a first reference temperature, the charge voltage is Vc, and the drive current is I, and when the temperature of said capacitor is a second temperature and the drive current is $\alpha \cdot I$, the charge voltage is $Vc/\alpha$.

3. The electromagnetic repulsion drive switching device as set forth in claim 1, wherein said temperature sensing means includes a resistor having a resistance with a temperature dependency, said voltage control means controls the output voltage for charging said capacitor in response to a product of a reference voltage and a resistance ratio, and the resistance of said resistor is used in calculating the resistance ratio.

4. The electromagnetic repulsion drive switching device as set forth in claim 3, wherein said resistor has a resistance changing inversely with respect to temperature and including a voltage limiting element connected in parallel with said resistor limiting voltage across said resistor.

5. The electromagnetic repulsion drive switching device as set forth in claim 1, wherein said repulsion member is a flat metal member.

6. The electromagnetic repulsion drive switching device as set forth in claim 1, wherein said repulsion member is a repulsion coil for generating an electromagnetic force opposed to an electromagnetic force generated by a selected one of said contact-closing coil and said contact-opening coil.

7. An electromagnetic repulsion drive switching device comprising:
- a contact-closing coil and a contact-opening coil;
- a conductive repulsion member confronting said contact-closing and contact-opening coils;
- a capacitor feeding a drive current to a selected one of said contact-closing and contact-opening coils, said capacitor having a capacitance and an equivalent series resistance varying with temperature;

a charging power source generating an output voltage for charging said capacitor to a charge voltage to produce the drive current so that a stationary contact and a movable contact are brought into and out of contact by a repulsion electromagnetic force generated between one of said contact-closing and contact-opening coils and said repulsion member in response to flow of the drive current;

temperature sensing means for outputting a temperature signal indicating temperature of said capacitor; and temperature control means for controlling the temperature of said capacitor to be within a working temperature range in response to the temperature signal so that a peak value of the drive current is within a working range when the temperature of said capacitor is within the working temperature range.

8. An electromagnetic repulsion drive switching device comprising:

a contact-closing coil and a contact-opening coil;

a conductive repulsion member confronting said contact-closing and contact-opening coils;

a capacitor feeding a drive current to a selected one of said contact-closing and contact-opening coils, said capacitor having a capacitance and an equivalent series resistance varying with temperature;

a charging power source generating an output voltage for charging said capacitor to a charge voltage to produce the drive current so that a stationary contact and a movable contact are brought into and out of contact by a repulsion electromagnetic force generated between one of said contact-closing and contact-opening coils and said repulsion member in response to flow of the drive current;

a variable impedance connected between said capacitor and said contact-closing and contact-opening coils; and impedance control means for controlling impedance of said variable impedance in response to the temperature of said capacitor so that a peak value of the drive current is within a working range when the temperature of said capacitor is within a working temperature range.

9. The electromagnetic repulsion drive switching device as set forth in claim 8, wherein said variable impedance includes a variable inductance and a variable resistor.

* * * * *